(12) United States Patent
Oto

(10) Patent No.: US 8,233,101 B2
(45) Date of Patent: Jul. 31, 2012

(54) LAMINATED WAVE PLATE, OPTICAL PICKUP DEVICE, POLARIZATION CONVERTER, AND PROJECTION DISPLAY APPARATUS

(75) Inventor: Masayuki Oto, Zama (JP)

(73) Assignee: Seiko Epson Corporation (JP)

( * ) Notice: Subject to any disclaimer, the term of this patent is extended or adjusted under 35 U.S.C. 154(b) by 315 days.

(21) Appl. No.: 12/727,543

(22) Filed: Mar. 19, 2010

(65) Prior Publication Data

US 2010/0245692 A1    Sep. 30, 2010

(30) Foreign Application Priority Data

Mar. 30, 2009    (JP) ................... 2009-081231

(51) Int. Cl.
*G02F 1/13363* (2006.01)
*G02F 1/1335* (2006.01)
*G02B 5/30* (2006.01)
*G11B 7/00* (2006.01)

(52) U.S. Cl. ........ 349/9; 359/494; 369/112.23; 349/117

(58) Field of Classification Search ............ 349/9, 5, 349/62, 113, 117, 119; 359/494, 489.07, 359/489.15, 485, 497, 483; 369/112.23, 369/112.09, 112.14, 112.27, 112.17, 112.01, 369/44.32, 112.02; 356/487

See application file for complete search history.

(56) References Cited

U.S. PATENT DOCUMENTS

| | | | | |
|---|---|---|---|---|
| 628,962 | A * | 7/1899 | Speer | 173/124 |
| 3,574,441 | A * | 4/1971 | Harris et al. | 359/250 |
| 6,025,958 | A | 2/2000 | Yamaoka et al. | |
| 6,095,653 | A | 8/2000 | Yajima | |
| 7,936,508 | B2 * | 5/2011 | Oto | 359/489.07 |
| 7,986,608 | B2 * | 7/2011 | Oto | 369/112.17 |
| 7,995,276 | B2 * | 8/2011 | Oto | 359/489.07 |
| 8,031,401 | B2 * | 10/2011 | Oto | 359/489.07 |
| 8,107,351 | B2 * | 1/2012 | Oto | 369/112.27 |
| 2005/0180296 | A1 * | 8/2005 | Ooto | 369/112.22 |

(Continued)

FOREIGN PATENT DOCUMENTS

JP    8-7322    1/1996

(Continued)

OTHER PUBLICATIONS

Office Action for U.S. Appl. No. 12/727,562 dated May 12, 2011, p. 1-8.

*Primary Examiner* — Akm Ullah
(74) *Attorney, Agent, or Firm* — Harness, Dickey & Pierce, P.L.C.

(57) ABSTRACT

A laminated wave plate includes a first wave plate with a phase difference of $\Gamma_1=180°$ with respect to a designed wavelength $\lambda_0$ and a second wave plate with a phase difference of $\Gamma_2=180°$, in which the first wave plate and the second wave plate are arranged and laminated so that optical axes thereof intersect each other, the laminated wave plate converting an incident linearly-polarized beam into a linearly-polarized beam obtained by rotating a polarization plane of the incident linearly-polarized beam by a predetermined angle $\phi$ and outputting the converted linearly-polarized beam. When in-plane bearing angles formed by the polarization plane of the incident linearly-polarized beam and optical axes of the first and second wave plates are represented by $\theta_1$ and $\theta_2$ and an optical axis adjustment amount is represented by a, the following expressions are satisfied: $\theta_1=\phi/4+a$; and $\theta_2=3\phi/4-a$.

11 Claims, 17 Drawing Sheets

U.S. PATENT DOCUMENTS

| | | | |
|---|---|---|---|
| 2007/0003775 A1 | 1/2007 | Ushino et al. | |
| 2007/0247633 A1* | 10/2007 | Oto | 356/487 |
| 2007/0291357 A1* | 12/2007 | Oto | 359/485 |
| 2008/0180799 A1 | 7/2008 | Ooto | |
| 2008/0239487 A1* | 10/2008 | Kobayashi et al. | 359/485 |
| 2008/0310285 A1* | 12/2008 | Oto | 369/112.16 |

FOREIGN PATENT DOCUMENTS

| | | |
|---|---|---|
| JP | 2519198 | 5/1996 |
| JP | 11-149015 | 6/1999 |
| JP | 3174367 | 3/2001 |
| JP | 2004-38025 | 2/2004 |
| JP | 2004-70299 | 3/2004 |
| JP | 2004-170853 | 6/2004 |
| JP | 2004-264620 | 9/2004 |
| JP | 2007-206225 | 8/2007 |
| JP | 2007-304572 | 11/2007 |
| JP | 4103469 | 4/2008 |
| JP | 2008-268901 | 11/2008 |
| JP | 4277514 | 3/2009 |
| WO | WO2007-046241 | 4/2007 |

* cited by examiner

LAMINATED WAVE PLATE, OPTICAL PICKUP DEVICE, POLARIZATION CONVERTER, AND PROJECTION DISPLAY APPARATUS

BACKGROUND

1. Technical Field

The present invention relates to a laminated wave plate in which two wave plates formed of an inorganic crystalline material such as quartz crystal having birefringence properties are arranged to overlap with each other, and an optical pickup device, a polarization converter, and a projection display apparatus which employ the laminated wave plate.

2. Related Art

A half-wave plate emitting as an output beam a linearly-polarized beam obtained by rotating a polarization plane of a linearly-polarized beam as an incident beam by a predetermined angle, for example, 90°, has been employed in optical devices such as an optical pickup device used for recording on and reproduction from an optical disk device, a polarization converter, and a projection display apparatus such as a liquid crystal projector. A wave plate formed of a single plate serves as a half-wave plate at a predetermined wavelength, since the phase difference thereof is determined depending on the thickness thereof. A laminated wave plate in which two or more single wave plates are bonded so that optical axes thereof intersect has been developed which serves as a half-wave plate in a broader wavelength range (for example, see JP-A-11-149015).

The optical pickup device used for recording on and reproduction from an optical disk device employs a violet-blue laser beam with a very short wavelength and high power so as to increase the recording density and the capacity thereof. In the liquid crystal projector, durability and long-term reliability are required for a half-wave plate as an optical component of an optical engine with elongation in the lifetime of the optical engine.

However, the half-wave plate described in JP-A-11-149015 has a structure in which plural sheets of stretched films obtained by stretching a polymer film formed of polycarbonate or the like to give a phase difference of a half wavelength thereto are laminated. Accordingly, the polymer film of the half-wave plate may absorb the violet-blue laser beam and may emit heat and the material itself may deteriorate, thereby damaging the function of the wave plate. On the contrary, since an inorganic crystalline material such as quartz crystal or calcite has very high light resistance, a wave plate formed of quartz crystal or the like can be advantageously used in an optical system employing the violet-blue laser beam.

Optical disk recording and reproducing apparatuses require a function of enabling the recording on and reproduction from recording mediums such as a Blu-ray disk, a DVD, and CD based on different standards. In general, the Blu-ray disk is used at a wavelength band of 405 nm, the DVD is used at a wavelength band of 660 nm, and the CD is used at a wavelength band of 785 nm. Accordingly, it is preferable that the half-wave plate of the optical pickup device operates at all or two wavelength bands of the above-mentioned wavelength bands. On the other hand, the half-wave plate used in the polarization converter of the liquid crystal projector needs to maintain a phase difference of 180° in a broad wavelength range of 400 nm to 700 nm.

In general, since a half-wave plate has wavelength dependence that phase difference varies with a variation in wavelength, the phase difference increases or decreases in wavelength bands in the vicinity of a target wavelength. Therefore, a laminated wave plate has been suggested (for example, JP-A-2004-170853) the whole of which serves as a half-wave plate in the broad wavelength range of 400 to 700 nm and is formed by bonding a first wave plate with an optical axis bearing angle $\theta_1$ and a second wave plate with an optical axis bearing angle $\theta_2$ so that the optical axes thereof intersect each other and satisfy the relations of $\theta_2=\theta_1+45°$ and $0<\theta_1<45°$.

When a beam emitted from a light source is incident on the half-wave plate, there is a problem with the incident angle dependence that the phase difference varies in regions other than the vicinity of the center of the wave plate. Accordingly, a polarization conversion efficiency of the half-wave plate, that is, a ratio at which the incident linearly-polarized beam of P polarization (or S polarization) is converted into a linearly-polarized beam of S polarization (or P polarization) and the resultant beam is output, is lowered, thereby causing a loss of light intensity. Therefore, a high-order-mode laminated wave plate is known in which first and second wave plates with a phase difference of $180°+360°\times n$ (where n is a positive integer) are bonded so that the optical axes thereof intersect each other and $\theta_2=\theta_1+\theta/2$ is satisfied, where in-plane bearing angles of the first and second wave plates are represented by $\theta_1$ and $\theta_2$ and an angle formed by the polarization direction of the linearly-polarized beam incident on the laminated wave plate and the polarization direction of the linearly-polarized beam output therefrom is represented by $\theta$ (For example, JP-A-2007-304572). By setting n=5, $\theta_1=22.5°$, and $\theta_2=67.5°$ in the laminated wave plate, the wavelength conversion efficiency with the variation in wavelength can be set to almost 1 in three wavelength bands of 405 nm, 660 nm, and 785 nm, thereby suppressing the loss in light intensity.

Similarly, to improve the polarization conversion efficiency, a laminated wave plate is suggested which serves as a half-wave plate in which a first wave plate with a phase difference $\Gamma_a=180°$ and a second wave plate with a phase difference $\Gamma_b=180°$ are bonded, the optical axis bearing angles $\theta_a$ and $\theta_b$ of the first and second wave plates satisfy $\theta_b=\theta_a+\alpha$, $0<\theta_a<45°$, and $40°<\alpha<50°$, and a difference $\Delta\Gamma_a$ of the phase difference $\Gamma_a$ from a designed target value and a difference $\Delta\Gamma_b$) of the phase difference $\Gamma_b$ from a designed target value satisfy a predetermined relational expression (for example, see JP-A-2008-268901). In this laminated wave plate, by canceling the difference $\Delta\Gamma_a$ of the phase difference $\Gamma_a$ from the designed target value with the difference $\Delta\Gamma_b$ of the phase difference $\Gamma_b$ from the designed target value on the basis of the predetermined relational expression, it is possible to obtain a high polarization conversion efficiency.

FIGS. 15A and 15B are diagrams illustrating a typical example of the above-mentioned laminated half-wave plate according to the related art. The laminated half-wave plate 1 includes first and second wave plates 2 and 3 which are formed of an optical uniaxial crystalline material such as a quartz crystal substrate and which are arranged sequentially from the light incidence side Li to the light output side Lo. The first and second wave plates 2 and 3 are single-mode half-wave plates with phase differences of $\Gamma_1=180°$ and $\Gamma_2=180°$, respectively, and are bonded so that crystal optical axes 4 and 5 thereof intersect each other at a predetermined angle. Here, the optical axis bearing angle $\theta_2$ of the first wave plate 2 is an angle formed by the crystal optical axis 4 and the polarization plane of a linearly-polarized beam 6 incident on the laminated half-wave plate 1 and the optical axis bearing angle $\theta_2$ of the second wave plate 3 is an angle formed by the crystal optical axis 5 and the polarization plane of the linearly-polarized beam.

In the laminated half-wave plate 1 shown in FIGS. 15A and 15B, the optical axis bearing angles of the first and second wave plates 2 and 3 are set to $\theta_2=22.5°$ and $\theta_2=67.5°$, respectively, and the angle formed by the polarization direction of an incident linearly-polarized beam 6 and the polarization direction of an output linearly-polarized beam 7 is set to 90°. The polarization state in this case is described now using a Poincare sphere shown in FIGS. 16A to 16C. FIG. 16A is a diagram illustrating a trajectory transition in the Poincare sphere of the linearly-polarized beam incident on the laminated half-wave plate 1. A position in the equatorial line at which the linearly-polarized beam 4 is incident is set to an intersection point $P_0$ with an axis S1. FIG. 16B is a view illustrating the locus of the polarization state of a beam incident on the laminated half-wave plate 1 as viewed from an axis S2 in the Poincare sphere shown in FIG. 16A, that is, a projected diagram onto the plane S1S3. FIG. 16C is a view illustrating the locus of the polarization state of a beam incident on the laminated half-wave plate 1 as viewed from an axis S3 in the Poincare sphere shown in FIG. 16A, that is, a projected diagram onto the plane S1S2.

The reference point of the incident beam is set to a point $P_0=(1, 0, 0)$, the rotation axis $R_1$ of the first wave plate 2 is set to a position which is rotated from the axis S1 by $2\theta_1$, and the rotation axis $R_2$ of the second wave plate 3 is set to a position which is rotated from the axis S1 by $2\theta_2$. When the reference point $P_0$ is rotated about the rotation axis $R_1$ to the right side by the phase difference $\Gamma_1$, the point $P_1=(0, 1, 0)$ in the equatorial line of the Poincare sphere is the position of the output beam of the first wave plate 2. When the point $P_1$ is rotated about the rotation axis $R_2$ to the right side by the phase difference $\Gamma_2$, the point $P_2=(-1, 0, 0)$ in the equatorial line of the Poincare sphere is the position of the output beam of the second wave plate 3, that is, the position of the output beam of the laminated half-wave plate 1. As long as the wavelength of the incident beam Lo does not depart from the target value, the position of the output beam is located in the equatorial line of the Poincare sphere.

However, an optical pickup device mounted on a Blu-ray optical disk recording and reproducing apparatus employs a short-wavelength (405 nm) violet-blue laser. When the violet-blue laser expands due to the high temperature when being used, a problem is caused in that the wavelength of an oscillated laser drifts (varies). Accordingly, in the optical pickup device, the half-wave plate causes a problem that the conversion efficiency of the linearly-polarized beam is deteriorated due to the wavelength drift of the incident laser beam.

In the optical disk recording and reproducing apparatus enabling the recording and reproduction of both a Blu-ray disc and a DVD, the wavelength drift of the laser beam may occur in one of the used wavelength bands of 405 nm and 660 nm. Accordingly, in the half-wave plate used in the optical disk recording and reproducing apparatus, it is necessary to suppress the deterioration in conversion efficiency with the variation in wavelength in both bands.

JP-A-2004-170853 discloses a method for preventing or reducing the influence of the variation in wavelength. In this method, when the differences of the phase differences of the first and second wave plates due to the variation in wavelength are $\Delta\Gamma_1$ and $\Delta\Gamma_2$, the differences of the phase differences can be canceled by setting $\Delta\Gamma_1=\Delta\Gamma_2$. Accordingly, the position $P_2$ of the output beam in the Poincare sphere is always located in the equatorial line.

This will be described using the Poincare sphere shown in FIGS. 16A to 16C. The position of the output beam of the first wave plate 2 is the point $P_1'$ rotated about the rotation axis $R_1$ from the point $P_1$ to the right side by the difference $\Delta\Gamma_1$. The position of the output beam of the second wave plate 3 is the point $P_2'$ in the equatorial line of the Poincare sphere which is rotated about the rotation axis $R_2$ from the point $P_1'$ to the right side by the difference $\Gamma_2+\Delta\Gamma_2$. The point $P_2'$ is the position of the output beam from the laminated half-wave plate 1. As can be seen from the drawings, since the point $P_2'$ is deviated from the point $P_2$ in the equatorial line, the rotation of the polarization plane of the output beam is deviated from 90°. As described in JP-A-2004-170853, since the rotational deviation of the polarization plane of the output beam can be less influenced as $\Delta\Gamma_1$ and $\Delta\Gamma_2$ become less, it is preferable that the first and second wave plates 2 and 3 are formed of single-mode wave plates, respectively, thereby reducing the wavelength dependence as much as possible.

JP-A-2008-268901 discloses a problem that the position of the output beam of the first wave plate in the Poincare sphere is deviated when the thickness processing accuracy of the first wave plate is deviated from the designed value. To solve this problem, JP-A-2008-268901 discloses a method of processing the thickness of the second wave plate so as to cancel the deviation of the position of the output beam of the first wave plate. However, in the laminated half-wave plate disclosed in JP-A-2007-304572, since the first and second wave plates are the high-order-mode wave plates, there is a problem in that the wavelength bandwidth in which the conversion efficiency is close to 1 is reduced when the order n is excessively increased, thereby making it difficult to use it as the laminated half-wave plate.

Here, the conversion efficiency is an estimated value used to accurately determine the polarization state of the output beam of the laminated half-wave plate including two wave plates bonded to each other, as described in JP-A-2007-304572, and is obtained by calculating the light intensity of the output beam with respect to the incident beam by a predetermined calculation technique. This method is simply described below.

In the laminated half-wave plate 1, when the Muller matrix of the first wave plate 2 is represented by $R_1$, the Muller matrix of the second wave plate 3 is represented by $R_2$, the polarization state of the input beam is represented by vector I, and the polarization state of the output beam is represented by vector E, the polarization state of the beam having passed through the laminated half-wave plate 1 can be expressed by the following expression.

$$E=R_2 \cdot R_1 \cdot I \quad\quad\quad \text{Expression 1}$$

Here, $R_1$ and $R_2$ are expressed by the following expressions.

Expression 2

$$R_1 = \begin{bmatrix} 1 & 0 & 0 & 0 \\ 0 & 1-(1-\cos\Gamma_1)\sin^2 2\theta_1 & (1-\cos\Gamma_1)\sin 2\theta_1\cos 2\theta_1 & -\sin\Gamma_1\sin 2\theta_1 \\ 0 & (1-\cos\Gamma_1)\sin 2\theta_1\cos 2\theta_1 & 1-(1-\cos\Gamma_1)\sin^2 2\theta_1 & \sin\Gamma_1\cos 2\theta_1 \\ 0 & \sin\Gamma_1\sin 2\theta_1 & -\sin\Gamma_1\cos 2\theta_1 & \cos\Gamma_1 \end{bmatrix} \quad (2)$$

Expression 3

$$R_2 = \begin{bmatrix} 1 & 0 & 0 & 0 \\ 0 & 1-(1-\cos\Gamma_2)\sin^2 2\theta_2 & (1-\cos\Gamma_2)\sin 2\theta_2\cos 2\theta_2 & -\sin\Gamma_2\sin 2\theta_2 \\ 0 & (1-\cos\Gamma_2)\sin 2\theta_2\cos 2\theta_2 & 1-(1-\cos\Gamma_2)\cos^2 2\theta_2 & \sin\Gamma_2\cos 2\theta_2 \\ 0 & \sin\Gamma_2\sin 2\theta_2 & -\sin\Gamma_2\cos 2\theta_2 & \cos\Gamma_2 \end{bmatrix} \quad (3)$$

When the order n of the high-order mode of the first and second wave plates 2 and 3, the phase differences $\Gamma_1$ and $\Gamma_2$, and the optical axis bearing angles $\theta_1$ and $\theta_2$ are set, the Muller matrixes $R_1$ and $R_2$ are calculated by using Expressions 2 and 3, and the polarization state I of the incident beam is set, the polarization state E of the output beam is calculated by using Expression 1. The polarization state E of the output beam is called a Stokes vector and is expressed by the following expression.

Expression 4

$$E = \begin{bmatrix} S_{01} \\ S_{11} \\ S_{21} \\ S_{31} \end{bmatrix} \quad (4)$$

Here, the E matrix elements $S_{01}$, $S_{11}$, $S_{21}$, and $S_{31}$ are called Stokes parameters and indicate the polarization state. When the transmission axis of a matrix P of a polarizer is set to a predetermined angle and the product of the matrix E indicating the polarization state E of the output beam and the matrix P of the polarizer is T, T is expressed by the following expression.

Expression 5

$$T = P \cdot E \quad (5)$$

The matrix T indicates the conversion efficiency and can be expressed by the following expression using the Stokes parameters of the elements.

Expression 6

$$T = \begin{bmatrix} S_{02} \\ S_{12} \\ S_{22} \\ S_{32} \end{bmatrix} \quad (6)$$

Here, when the Stokes parameter $S_{02}$ of the vector T represents the light intensity and the incident light intensity is set to 1, the Stokes parameter $S_{02}$ is the conversion efficiency. Accordingly, the conversion efficiency T of the laminated half-wave plate 1 can be simulated while variously changing the order n of the high-order mode of the first and second wave plates 2 and 3, the phase differences $\Gamma_1$ and $\Gamma_2$ at a predetermined wavelength (for example, at a wavelength of 405 nm), and the optical axis bearing angles $\theta_1$ and $\theta_2$.

FIG. 17 shows the simulation result of the variation in conversion efficiency T with respect to the wavelength of the incident beam using the calculation method when the designed wavelength $\lambda_0$, which is used in the laminated half-wave plate 1 shown in FIGS. 15A and 15B, is changed to 400, 500, 600, 700, and 800 nm. In the drawing, it can be seen in any designed wavelength that the conversion efficiency has a high value of almost 1 in the vicinities of the designed wavelength and decreases as the wavelength gets farther from the designed wavelengths. When the laminated half-wave plate is used in the optical pickup device, the conversion efficiency of the incident linearly-polarized beam may decrease due to the wavelength drift of the laser beam.

FIG. 18 shows the simulation result of the variation in conversion efficiency T with respect to the designed wavelengths of the wave plates using the calculation method when the used wavelength band of the laminated half-wave plate 1 shown in FIGS. 15A and 15B is changed to 405±30, 660±30, and 785±30 nm. In the drawing, it can be seen in any wavelength band that the conversion efficiency has a high value of almost 1 in the vicinities of the target wavelength bands and decreases as the designed wavelength gets farther from the target wavelength bands. This states that it is difficult to make the conversion efficiency be 1 at plural discrete wavelength bands in the laminated half-wave plate according to the related art.

SUMMARY

An advantage of some aspects of the invention is that it provides a laminated wave plate including first and second wave plates overlapping with each other so that optical axes thereof intersect each other, which can suppress as much as possible the decrease in conversion efficiency in a wavelength range with a broader bandwidth and realize an excellent conversion efficiency all over the wavelength range with a broad bandwidth of about 400 to 800 nm.

Another advantage of some aspects of the invention is that it provides an optical pickup device, a polarization converter, and an optical apparatus such as a projection display apparatus, which can exhibit stable and excellent performance in a wavelength range with a broader bandwidth by suppressing the influence of the variation in wavelength due to wavelength drift using the laminated wave plate.

As a result of various studies on the relationship between the variation in wavelength and the conversion efficiency, the inventor found out that by reducing the difference between the optical axis bearing angles $\theta_1$ and $\theta_2$ of the first and second wave plates and setting the rotation axis $R_1$ and the rotation axis $R_2$ in the Poincare sphere to be close to each other, it is possible to suppress the decrease in conversion efficiency in a wavelength range with a broader bandwidth. Accordingly, the conversion efficiency of the laminated half-wave plate 1 shown in FIGS. 15A and 15B was simulated using the above-mentioned calculation method in which the designed wavelength $\lambda_0$ is set to 500 nm when the optical axis bearing angles of the first and second wave plates 2 and 3 are set to $\theta_1=22.5°$ and $\theta_2=67.5°$ and when the optical axis bearing angles are changed in the ranges of $22.5°<\theta_1<45.0°$ and $45.0°<\theta_2<67.5°$. Here, a represents adjustment amounts (angle: deg.) of the optical axis bearing angles $\theta_1$ and $\theta_2$ from 22.5° and 67.5°, respectively.

This simulation result is shown in FIG. 19. As can be seen from the drawing, in the related art (a=0°), the conversion efficiency has a high value of almost 1 in a relatively narrow range centered on the designed wavelength and decreases as it gets farther from the designed wavelength. On the contrary, as the adjustment amounts a of the optical axis bearing angles slowly increase, the conversion efficiency slowly decreases in the vicinity of the designed wavelength $\lambda_0=500$ nm, but the wavelength position with the conversion efficiency of 1 exists in both sides thereof and gets slowly farther away. As a result, it was found out that excellent conversion efficiency is obtained in a broader wavelength range as a whole. The invention is made on the basis of this knowledge.

According to an aspect of the invention, in order to convert an incident linearly-polarized beam into a linearly-polarized beam with a polarization plane obtained by rotating the polarization plane of the incident linearly-polarized beam by a predetermined angle $\phi$ and to output the resultant linearly-polarized beam, there is provided a laminated wave plate including a first wave plate with a phase difference of $\Gamma_1=180°$ with respect to a designed wavelength $\lambda_0$ and a second wave plate with a phase difference of $\Gamma_2=180°$, in which the first wave plate and the second wave plate are arranged and laminated so that optical axes thereof intersect each other, the laminated wave plate converting an incident linearly-polarized beam into a linearly-polarized beam obtained by rotating a polarization plane of the incident linearly-polarized beam by a predetermined angle $\phi$ and outputting the converted linearly-polarized beam. Here, when in-plane bearing angles formed by the polarization plane of the incident linearly-polarized beam and optical axes of the first and second wave plates are represented by $\theta_1$ and $\theta_2$ and an optical axis adjustment amount is represented by a, the following expressions are satisfied:

$\theta_1=\phi/4+a$; and $\theta_2=3\phi/4-a$.

According to this configuration, by reducing the difference of the in-plane bearing angles $\theta_1$ and $\theta_2$ of the optical axes of the first and second wave plates, it is possible to suppress as much as possible the decrease in conversion efficiency in the entire wavelength range with a broad bandwidth, thereby obtaining the excellent conversion efficiency of 1 or a value close to 1. Accordingly, it is possible to implement a laminated wave plate with a stable and very high utilization efficiency of light even when the wavelength of the incident beam varies in a broad band.

According to another aspect of the invention, there is provided a laminated wave plate including a first wave plate with a phase difference of $\Gamma_1=180°$ with respect to a designed wavelength $\lambda_0$ and a second wave plate with a phase difference of $\Gamma_2=180°$, in which the first wave plate and the second wave plate are arranged and laminated so that optical axes thereof intersect each other. Here, when in-plane bearing angles of optical axes of the first and second wave plates are represented by $\theta_1$ and $\theta_2$, an angle formed by a polarization direction of the linearly-polarized beam incident on the laminated wave plate and a polarization direction of a linearly-polarized beam output from the laminated wave plate is represented by $\phi$, and an optical axis adjustment amount is represented by a, the following expressions are satisfied:

$\theta_2=\theta_1+\phi/2$;

$\theta_1=\phi/4+a$;

$\theta_2=3\phi/4-a$; and $0<a\leq a_{max}$. In addition, the maximum value $a_{max}$ of the optical axis adjustment amount satisfies the following expressions in the designed wavelength range of $400\leq\lambda_0\leq490$ nm:

$a_{max}=A_0+A_1\cdot\phi+A_2\cdot\phi^2+A_3\cdot\phi^3+A_4\cdot\phi^4+A_5\cdot\phi^5$;

$A_0=0.00001548$;
$A_1=0.0427887$;
$A_2=-0.000385$;
$A_3=1.723\times10^{-6}$;
$A_4=-4.19\times10^{-9}$; and
$A_5=4.086\times10^{-12}$, satisfies the following expressions in the designed wavelength range of $490\leq\lambda_0\leq520$ nm:

$a_{max}=A_0+A_1\cdot\phi+A_2\cdot\phi^2+A_3\cdot\phi^3+A_4\cdot\phi^4+A_5\cdot\phi^5+A_6\cdot\phi^6+A_7\cdot\phi^7$;

$A_0=0.00006705$;
$A_1=17.699248$;
$A_2=-0.16963$;
$A_3=0.0006754$;
$A_4=-1.4\times10^{-6}$;
$A_5=1.68\times10^{-9}$;
$A_6=-1.1\times10^{-12}$; and
$A_2=2.72\times10^{-16}$, and satisfies the following expressions in the designed wavelength range of $520\leq\lambda_0\leq800$ nm:

$a_{max}=A_0+A_1\cdot\phi+A_2\cdot\phi^2+A_3\cdot\phi^3+A_4\cdot\phi^4+A_5\cdot\phi^5+A_6\cdot\phi^6$;

$A_0=0.00003014$;
$A_1=5.4681617$;
$A_2=-0.038557$;
$A_3=0.0001094$;
$A_4=-1.56\times10^{-7}$;
$A_5=1.106\times10^{-10}$; and
$A_6=-3.13\times10^{-14}$.

According to this configuration, by reducing the difference of the in-plane bearing angles $\theta_1$ and $\theta_2$ of the optical axes of the first and second wave plates, it is possible to suppress as much as possible the decrease in conversion efficiency in the entire wavelength range with a broader bandwidth of 400 to 800 nm, thereby obtaining the excellent conversion efficiency of 1 or a value close to 1. Accordingly, it is possible to implement a laminated wave plate with a stable and very high utilization efficiency of light even when the wavelength of the incident beam varies in a broad band.

The designed wavelength of the laminated wave plate may be set to $\lambda_0=500$ nm and the optical axis adjustment amount may be set to the range of $2.8°\leq a\leq3°$. According to this configuration, in both wavelength bands of 405 nm and 660 nm used in the Blu-ray disc and the DVD standards, it is possible to make the conversion efficiency of the laminated wave plate be almost 1.

The designed wavelength of the laminated wave plate may be set to $\lambda_0=510$ nm and the optical axis adjustment amount may be set to the range of $0°<a\leq2.2°$. According to this configuration, it is possible to obtain a very high conversion efficiency of 1 or a value close to 1 all over the wavelength range of 400 to 700 nm, which is suitable for a liquid crystal projector.

In the laminated wave plate, the first and second wave plates may be formed of quartz crystal. According to this configuration, it is possible to obtain very high light resistance. Accordingly, when a short-wavelength and high-power violet-blue laser is used in an optical system, it is possible to provide high reliability.

According to another aspect of the invention, in order to convert an incident linearly-polarized beam into a linearly-polarized beam with a polarization plane obtained by rotating the polarization plane of the incident linearly-polarized beam by a predetermined angle of 90° and to output the resultant linearly-polarized beam, there is provided a laminated wave plate including a first wave plate with a phase difference of $\Gamma_1=180°$ with respect to a designed wavelength $\lambda_0$ and a second wave plate with a phase difference of $\Gamma_2=180°$, in which the first wave plate and the second wave plate are arranged and laminated so that optical axes thereof intersect each other, the laminated wave plate converting an incident linearly-polarized beam into a linearly-polarized beam obtained by rotating a polarization plane of the incident linearly-polarized beam by a predetermined angle of 90° and outputting the converted linearly-polarized beam. When in-plane bearing angles formed by the polarization plane of the incident linearly-polarized beam and optical axes of the first and second wave plates are represented by $\theta_1$ and $\theta_2$, the following expressions are satisfied:

$22.5°<\theta_1<45.0°$; and $45.0°<\theta_2<67.5°$.

Similarly, accordingly to this configuration, by reducing the difference of the in-plane bearing angles $\theta_1$ and $\theta_2$ of the optical axes of the first and second wave plates, it is possible to suppress as much as possible the decrease in conversion efficiency in the entire wavelength range with a broad bandwidth, thereby obtaining the excellent conversion efficiency of 1 or a value close to 1. Accordingly, it is possible to implement a laminated wave plate with a stable and very high utilization efficiency of light even when the wavelength of the incident beam varies in a broad band.

According to another aspect of the invention, there is provided an optical pickup device including: a light source; an objective lens focusing a beam emitted from the light source on a recording medium; a detector detecting the beam reflected from the recording medium; and the above-mentioned laminated wave plate which is disposed in an optical path between the light source and the objective lens. As described above, by employing the laminated wave plate in which the decrease in conversion efficiency in the wavelength range with a broad bandwidth is suppressed as much as possible, it is possible to achieve an optical pickup device which is hardly affected by the variation in wavelength due to a temperature drift of the oscillated laser beam when being used and which can exhibit stable and excellent performance in the wavelength range with a broader bandwidth. Particularly, it is possible to provide an optical pickup device which can be used for plural different disk standards of the Blu-ray disc, the DVD, and the CD.

According to another aspect of the invention, there is provided a polarization converter including: a flat light-transmitting substrate having a first main surface as a beam incidence surface and a second main surface as a beam output surface; first and second thin optical films disposed in the substrate; and a wave plate disposed on the second main surface of the light-transmitting substrate. Here, the first and second thin optical films are alternately arranged in parallel with a gap therebetween to be tilted about the first and second main surfaces, and the first thin optical film separates a beam input from the first main surface into a first linearly-polarized beam and a second linearly-polarized beam perpendicular to each other, transmits the first linearly-polarized beam, and reflects the second linearly-polarized beam. In addition, the second thin optical film reflects the second linearly-polarized beam reflected by the first thin optical film and outputs the reflected second linearly-polarized beam from the second main surface. The wave plate is the above-mentioned laminated wave plate which is disposed in a part of the second main surface outputting the first linearly-polarized beam transmitted by the first thin optical film or in apart of the second main surface outputting the second linearly-polarized beam reflected by the second thin optical film.

According to another aspect of the invention, there is provided a polarization converter including: a flat light-transmitting substrate having a first main surface as a beam incidence surface and a second main surface as a beam output surface; first and second thin optical films disposed in the light-transmitting substrate; and a wave plate. Here, the first and second thin optical films are alternately arranged in parallel with a gap therebetween to be tilted about the first and second main surfaces. The first thin optical film separates a beam input from the first main surface into a first linearly-polarized beam and a second linearly-polarized beam perpendicular to each other, transmits the first linearly-polarized beam, and reflects the second linearly-polarized beam. The second thin optical film reflects the second linearly-polarized beam reflected by the first thin optical film and emits the reflected second linearly-polarized beam from the second main surface. The wave plate is the above-mentioned laminated wave plate which is disposed and laminated on the beam output surface of the first thin optical film outputting the first linearly-polarized beam.

In this way, by employing the laminated wave plate in which the decrease in conversion efficiency in the wavelength range with a broad bandwidth is suppressed as much as possible, it is possible to achieve a polarization converter which has very high utilization efficiency of light in a broader band. Accordingly, it is possible to obtain a polarization converter which is suitable for a liquid crystal projector and which can be used, for example, in a broad wavelength range of 400 to 700 nm.

According to another aspect of the invention, there is provided a projection display apparatus including: a light source; the above-mentioned polarization converter for converting a beam from the light source into the second linearly-polarized beam and emitting the linearly-polarized beam; a modulator such as a liquid crystal panel for modulating the beam emitted from the polarization converter on the basis of image information to be projected; and a projection optical system for projecting a beam modulated by the modulator. Similarly, as described above, by employing the laminated wave plate in which the deterioration in conversion efficiency in the wavelength range with a broader bandwidth is suppressed as much as possible, it is possible to obtain a brighter image with the light source having the same power and to obtain an image having the same brightness even with a low-power light source, thereby reducing power consumption. Particularly, it is possible to implement a liquid crystal projector with a bright image in the entire broad wavelength range of 400 to 700 nm.

BRIEF DESCRIPTION OF THE DRAWINGS

The invention will be described with reference to the accompanying drawings, wherein like numbers reference like elements.

FIG. 11A shows the range of the optical axis adjustment amount by which an excellent conversion efficiency can be obtained at the wavelengths of 405 and 660 nm and FIG. 11B shows the range of the optical axis adjustment amount by which an excellent conversion efficiency can be obtained at the wavelengths of 405 and 785 nm.

DESCRIPTION OF EXEMPLARY EMBODIMENTS

Hereinafter, exemplary embodiments of the invention will be described in detail with reference to the accompanying drawings.

Figure 1A:
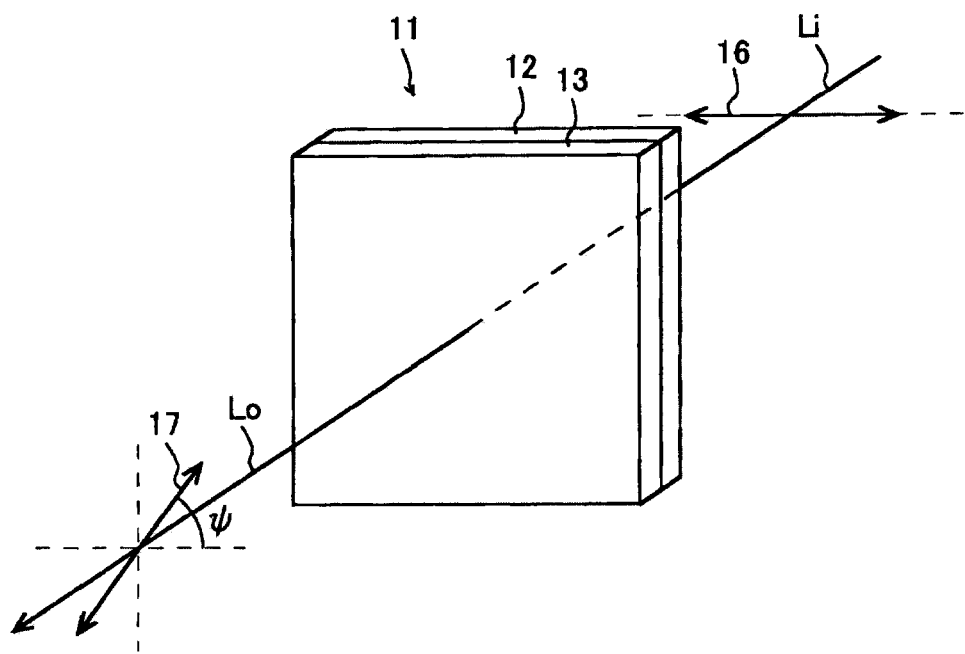
FIG. 1A is a perspective view illustrating a laminated half-wave plate according to an embodiment of the invention as viewed from an output side of a beam and FIG. 1B is a front view of the laminated half-wave plate as viewed from the output side.
Figure 1B:
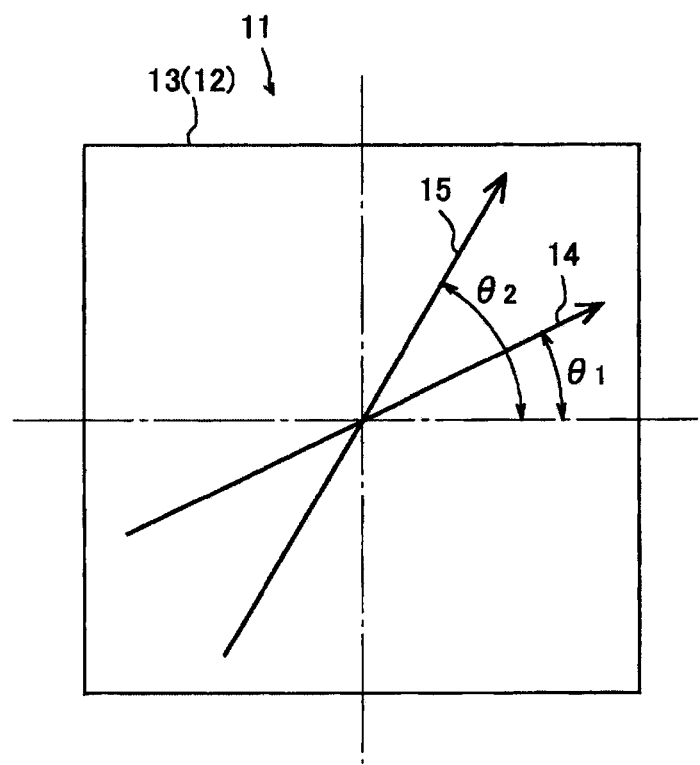

FIGS. 1A and 1B are diagrams illustrating a laminated half-wave plate according to an embodiment of the invention. The laminated half-wave plate 11 according to this embodiment includes first and second wave plates 12 and 13 formed of a quartz crystal plate which are arranged sequentially from the light incidence side Li to the light output side Lo. The first and second wave plates are bonded so that crystal optical axes 14 and 15 intersect each other at a predetermined angle. It is preferable that a Y-cut plate or an X-cut plate with excellent incident angle dependence is used as the quartz crystal plate.

The phase difference of the first wave plate 12 is set to $\Gamma_1=180°$ and the phase difference of the second wave plate 13 is set to $\Gamma_2=180°$. An optical axis bearing angle $\theta_1$ of the first wave plate 12 is an angle formed by the crystal optical axis 14 and the polarization plane of the linearly-polarized beam 16 incident on the laminated half-wave plate 11. An optical axis bearing angle $\theta_2$ of the second wave plate 13 is an angle formed by the crystal optical axis 15 and the polarization plane of the linearly-polarized beam 16 of the incident beam. $\phi$ represents an angle formed by the polarization direction of the incident linearly-polarized beam 16 and the polarization direction of the output linearly-polarized beam 17.

When the optical axis adjustment amount is represented by a and the maximum value thereof is represented by $a_{max}$, the optical axis bearing angles $\theta_1$ and $\theta_2$ are set to satisfy the following expressions:

$$\theta_1=\phi/4+a;$$

$$\theta_2=3\phi/4-a; \text{ and}$$

$$0<a\leq a_{max}.$$

Figure 15A:
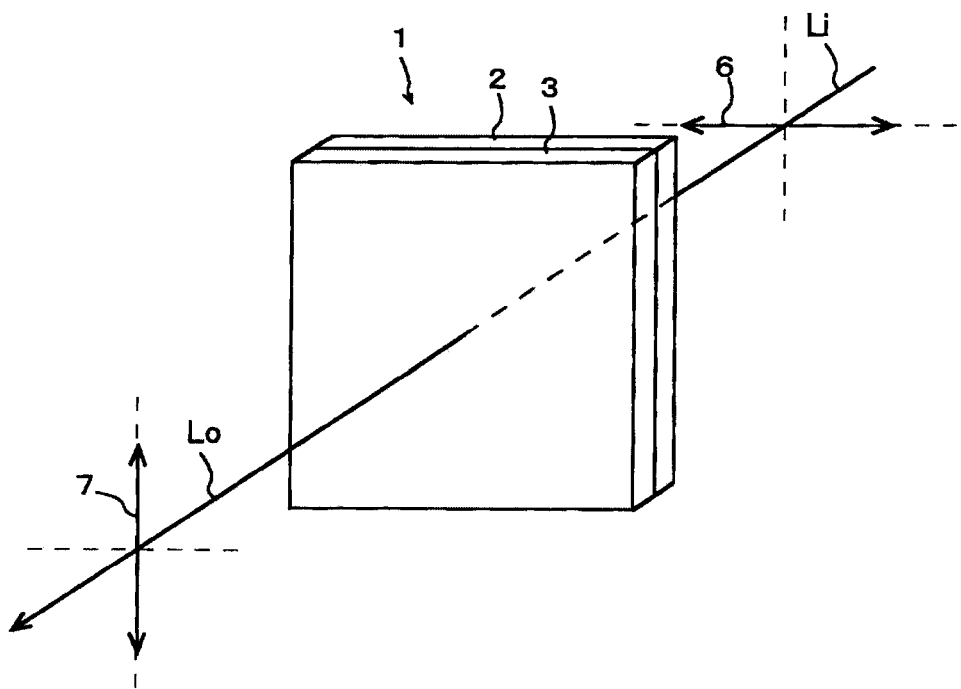
FIG. 15A is a perspective view illustrating a laminated half-wave plate according to the related art as viewed from a light output side and FIG. 15B is a front view of the laminated half-wave plate as viewed from a light output side.
Figure 15B:
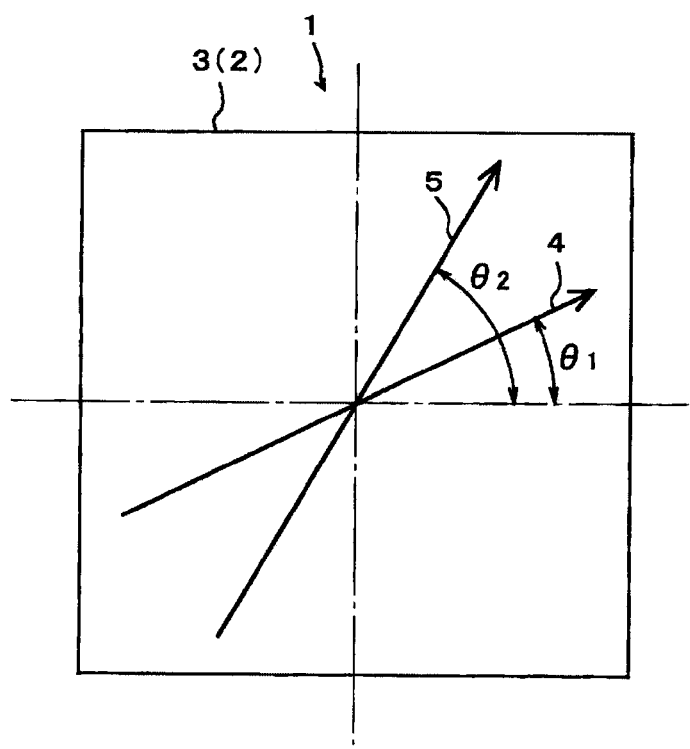

The maximum value $a_{max}$ of the optical axis adjustment amount is determined depending on the designed wavelengths of the first and second wave plates as described later. In this embodiment, for the purpose of easy comparison with the examples shown in FIGS. 15A and 15B, $\phi=90°$ is set. In this case, the optical axis bearing angles $\theta_1$ and $\theta_2$ of the first and second wave plates 12 and 13 are in the ranges of $22.5°<\theta_1<45.0°$ and $45.0°<\theta_2<67.5°$.

Figure 2A:
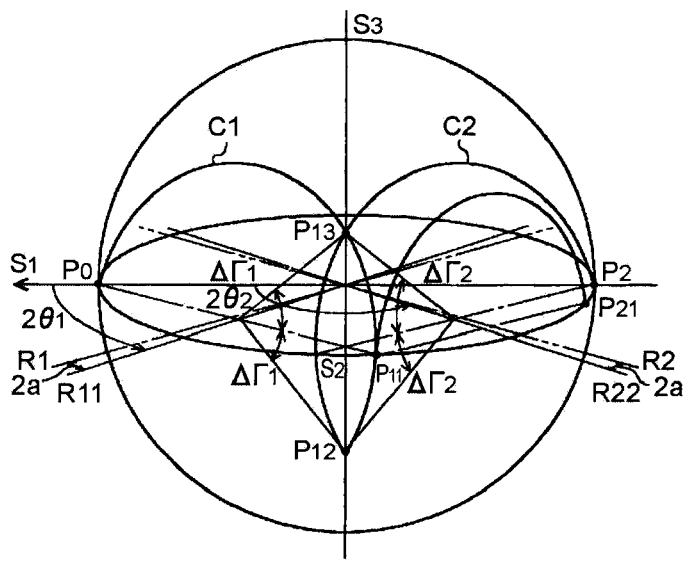
FIG. 2A is a diagram illustrating a Poincare sphere indicating the polarization state of the laminated half-wave plate shown in FIGS. 1A and 1B.
Figure 2B:
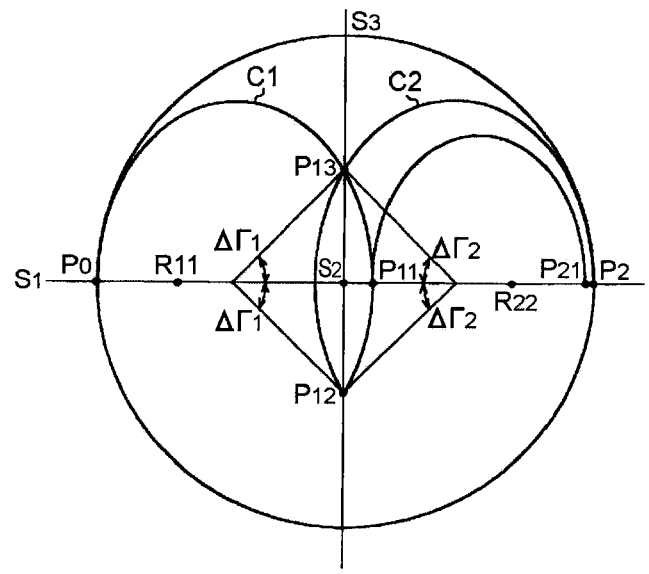
FIG. 2B is a diagram of the Poincare sphere as viewed from the direction of an axis S2.
Figure 2C:
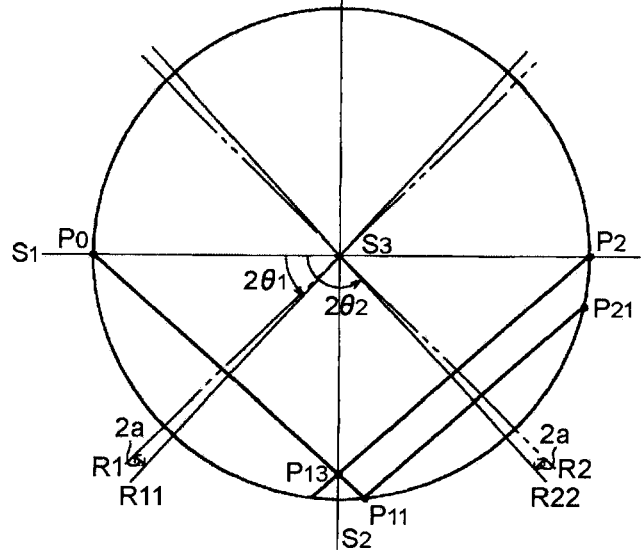
FIG. 2C is a diagram of the Poincare sphere as viewed from the direction of an axis S3.

The polarization state of the laminated half-wave plate 11 is described now using a Poincare sphere shown in FIGS. 2A to 2C. FIG. 2A is a diagram illustrating a trajectory transition in the Poincare sphere of the linearly-polarized beam incident on the laminated half-wave plate 11. A position in the equatorial line at which the linearly-polarized beam is incident is set to a point $P_0$ in an axis S1. FIG. 2B is a view illustrating the trajectory of the polarization state of the beam incident on the laminated half-wave plate 11 as viewed from an axis S2 in the Poincare sphere shown in FIG. 2A, that is, a projected diagram onto the plane S1S3. FIG. 2C is a view illustrating the locus of the polarization state of a beam incident on the laminated half-wave plate 11 as viewed from an axis S3 in the Poincare sphere shown in FIG. 2A, that is, a projected diagram onto the plane S1S2.

Figure 16A:
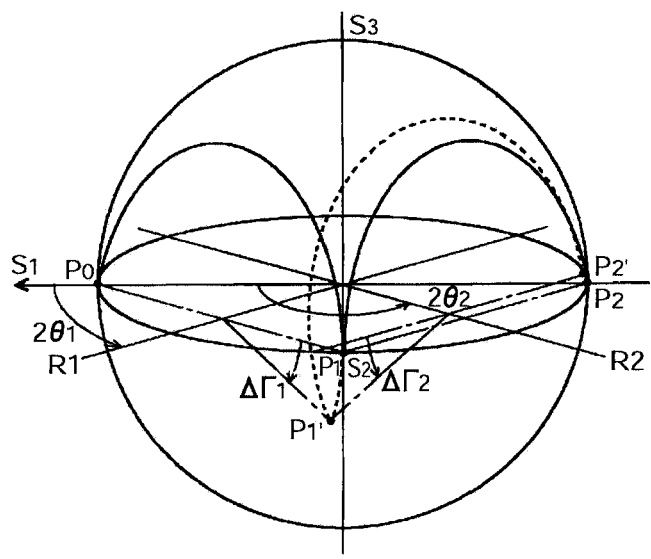
FIG. 16A is a diagram illustrating a Poincare sphere indicating a polarization state of the laminated half-wave plate shown in FIGS. 15A and 15B.
Figure 16B:
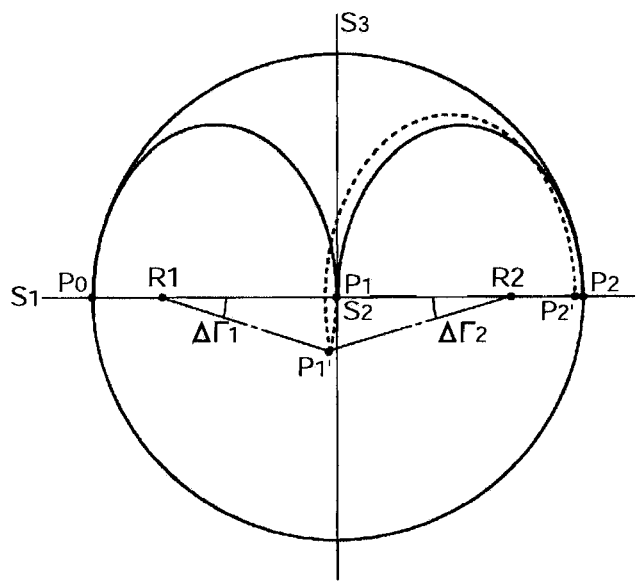
FIG. 16B is a view of the Poincare sphere as viewed from the direction of an axis S2.
Figure 16C:
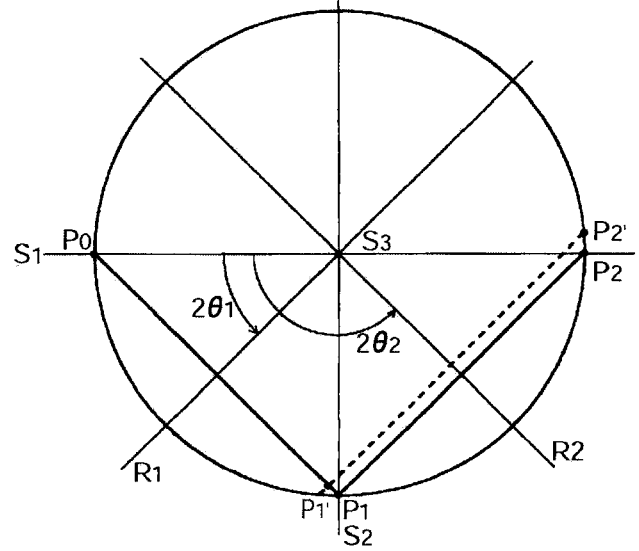
FIG. 16C is a view of the Poincare sphere as viewed from the direction of an axis S3.
Figure 17:
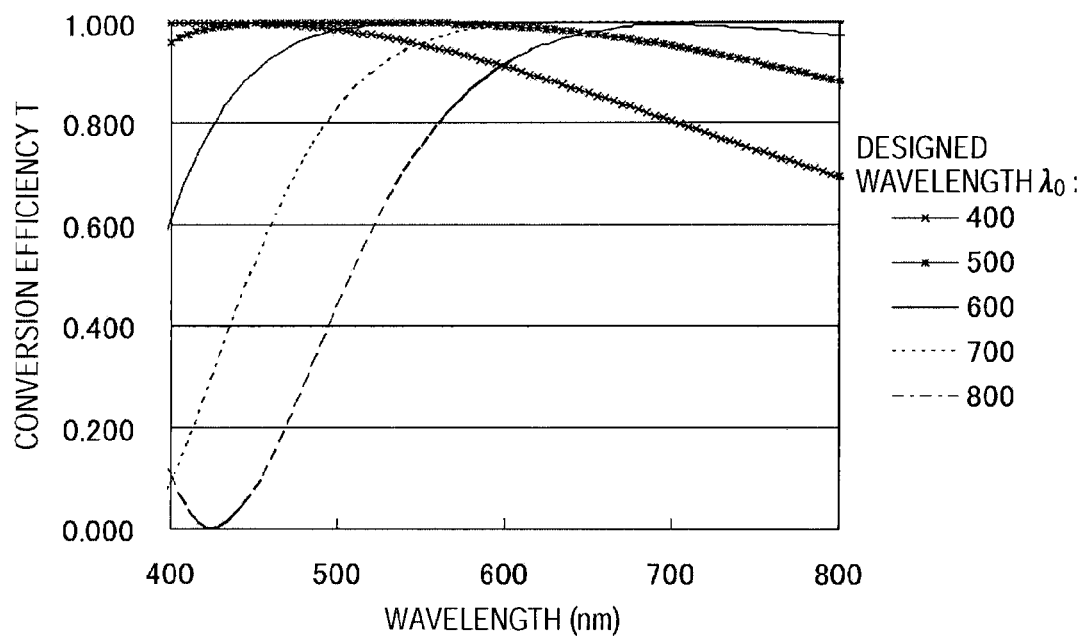
FIG. 17 is a diagram illustrating a variation in conversion efficiency with respect to the wavelength of the laminated half-wave plate shown in FIGS. 15A and 15B at five different designed wavelengths.
Figure 18:
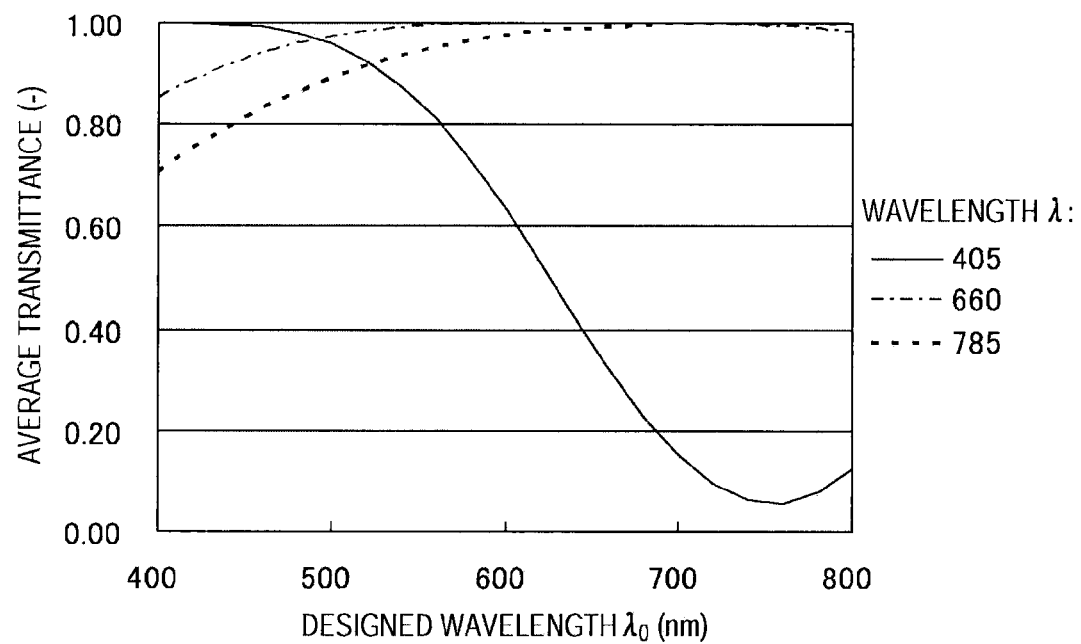
FIG. 18 is a diagram illustrating a variation in average transmittance with respect to the designed wavelength of the laminated half-wave plate shown in FIGS. 15A and 15B at three different wavelength bands.
Figure 19:
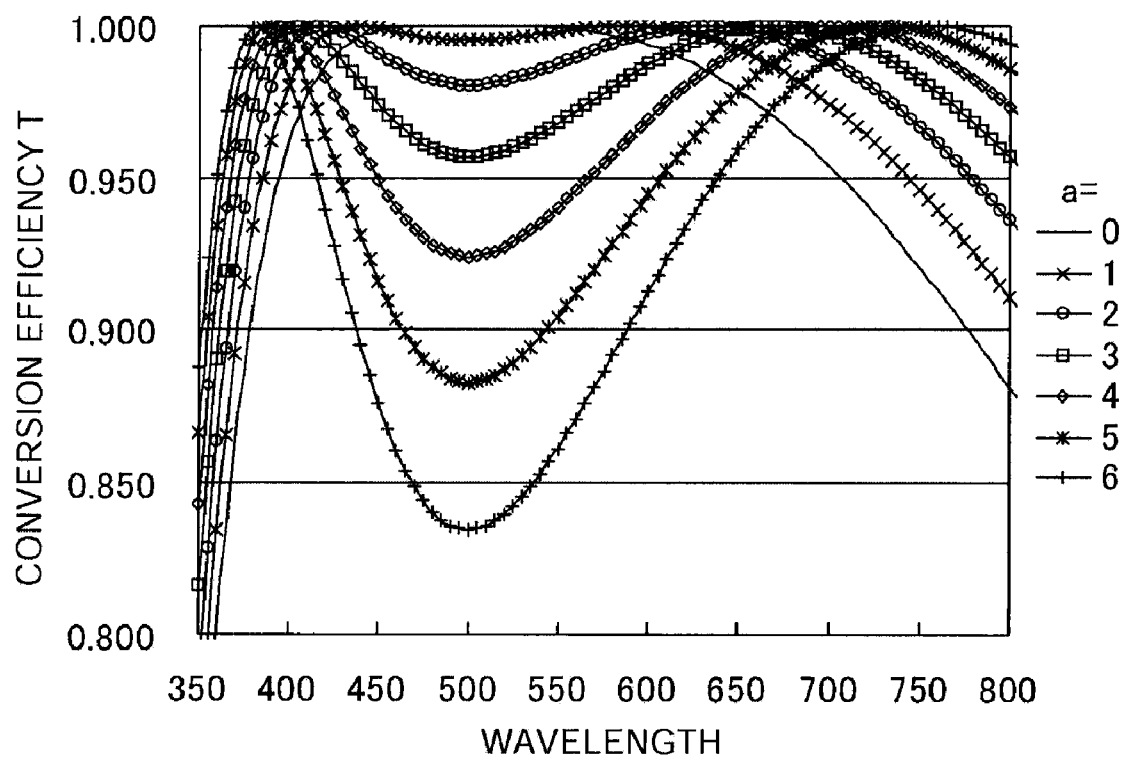
FIG. 19 is a diagram illustrating a variation in conversion efficiency with respect to the wavelength of the laminated half-wave plate shown in FIGS. 15A and 15B in comparison with the case where the optical axis adjustment amount varies.

The reference point of the incident beam is set to $P_0=(1, 0, 0)$ and the rotation axis $R_{11}$ of the first wave plate 12 is set to a position which is rotated from the axis S1 by $2\theta_1$. In this embodiment, since the optical axis bearing angle $\theta_1$ is set as described above, the rotation axis $R_{11}$ goes to the position which is rotated forward from the rotation axis $R_1$ with $\theta_1=22.5°$ in FIGS. 16A to 16C by angle $2a$. The rotation axis $R_{22}$ of the second wave plate 13 is similarly set to a position which is rotated from the axis S1 by $2\theta_2$. Since the optical axis bearing angle $\theta_2$ is set as described above, the rotation axis $R_{22}$ goes to the position which is rotated backward from the rotation axis $R_2$ with $\theta_2=67.5°$ in FIGS. 16A to 16C by angle $2a$.

The position of the output beam of the first wave plate 12 is a point on a circular arc C1 of the trajectory drawn in the Poincare sphere when the reference point $P_0$ is rotated about the rotation axis $R_H$ to the right side by the phase difference $\Gamma_1$. The circular arc C1 intersects an S2-S3 plane including the axes S2 and S3 at two points. Accordingly, when the phase difference $\Gamma_1$ is a set value of 180°, a position $P_{11}$ in the equatorial line which is slightly deviated from the point (0, 1, 0) of the Poincare sphere in the reverse direction of the reference point $P_0$ becomes the position of the output beam of the first wave plate.

The output beam of the second wave plate 13 is located at a point on the Poincare sphere when the position $P_{11}$ is rotated about the rotation axis $R_{22}$ in the right direction by the phase difference $\Gamma_2$. When the phase difference $\Gamma_2$ is the set value of 180°, a position $P_{21}$ in the equatorial line which is slightly turned back from the point $P_2$ (−1, 0, 0) of the Poincare sphere toward the reference point $P_0$ becomes the position of the output beam of the second wave plate, that is, the position of the output beam of the laminated half-wave plate 11. Consequently, as for the output beam, the rotation of the polarization plane is deviated from a desired angle $\phi=90°$.

In order for the rotation angle of the polarization plane of the output beam to become 90°, the position of the output beam on the Poincare sphere is required to reach the point $P_2$ (−1, 0, 0). In this case, the position of the output beam of the first wave plate 12 has to be a point on the Poincare sphere, where the point is obtained by rotating the point $P_2$ about the rotation axis $R_{22}$ in the reverse direction, that is, to the left side, by the phase difference $\Gamma_2$. At this time, a circular arc C2 on the locus drawn on the Poincare sphere by rotating the point $P_2$ about the rotation axis $R_{22}$ is symmetric with the circular arc C1 with respect to the S2-S3 plane, that is, has a mirror image relationship.

The circular arcs C1 and C2 have two intersection points $P_{12}$ and $P_{13}$ on the S2-S3 plane. Since the same phase differences $\Gamma_1$ and $\Gamma_2$ are set in the first wave plate 12 and the second wave plate 13, differences $\Delta\Gamma_1$ and $\Delta\Gamma_2$ of the phase differences due to the deviation in wavelength of the incident beam are also the same. Accordingly, when the position of the output beam of the first wave plate 12 on the Poincare sphere becomes the intersection points $P_{12}$ or $P_{13}$ between the circular arcs C1 and C2 due to the deviation of the phase difference $\Gamma_1$, the position of the output beam of the second wave plate 13 reaches the point $P_2$ (−1, 0, 0).

As a result, the wavelength at which the rotation angle of the polarization plane of the output beam of the laminated half-wave plate 11 is a desired angle $\phi=90°$ exists on both positive and negative sides of a target wavelength $\lambda$. When the laminated half-wave plate 11 has a necessary function of a half-wave plate at the target wavelength $\lambda$, the wavelength range, which corresponds to the phase difference range having the differences $\Delta\Gamma_1$ and $\Delta\Gamma_2$ of the phase differences of at least two points $P_{12}$ and $P_{13}$ in the Poincare sphere as the maximum values of the allowable deviation with respect to the designed phase differences $\Gamma_1$ and $\Gamma_2$, is considered as a usable wavelength range of the laminated half-wave plate 11 of which the central wavelength is the target wavelength $\lambda$.

The usable wavelength range in which the necessary function of the laminated half-wave plate 11 can be exhibited is determined by the set positions of the rotation axes $R_{11}$ and $R_{22}$ on the Poincare sphere, that is, by the set values of the optical axis adjustment amounts a. Thus, the conversion efficiency of the laminated half-wave plate 11 with respect to the optical axis adjustment amount a is simulated using the above-described calculation method according to the related art. In the following description, the conversion efficiency of the laminated half-wave plate according to the invention is simulated using the same calculation method.

Figure 3:
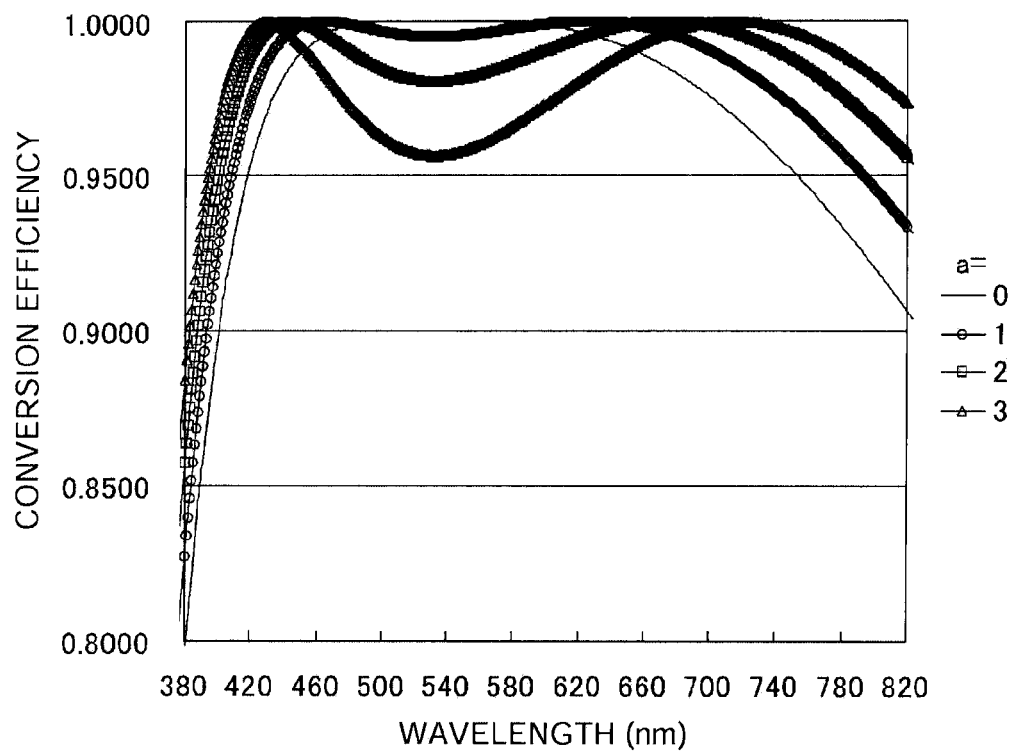
FIG. 3 is a diagram illustrating conversion efficiency with respect to frequency of the laminated half-wave plate with another optical axis adjustment amount.

FIG. 3 shows the simulation result of the conversion efficiency while changing the optical axis adjustment amount a from 0° to 3° by 1° in the wavelength range of 380 nm$\leq\lambda\leq$820 nm in the laminated half-wave plate 11, the designed wavelength is 536 nm which is almost the middle value between 405 nm as the wavelength band of the Blu-ray disc standard and 660 nm as the wavelength band of the DVD standard, shown in FIGS. 1A and 1B. It can be seen from the drawing that with an increase of the optical axis adjustment amount a, the wavelength position at which the conversion efficiency is 1 goes to both the positive and negative sides from the central wavelength $\lambda_0=536$ nm, but the conversion efficiency decreases in the vicinity of the central wavelength. At the time of actual use, the central wavelength, the allowable minimum value of the conversion efficiency, and the band to be used can be determined depending on the usage and specification of the laminated half-wave plate and the optical axis adjustment amount a for realizing them can be determined.

Figure 4:
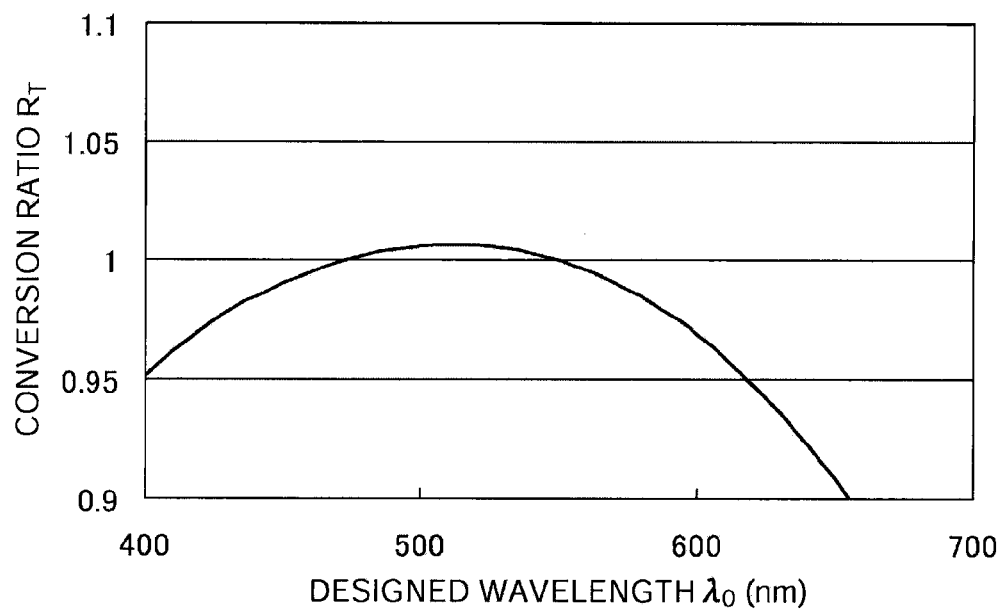
FIG. 4 is a diagram illustrating conversion efficiency with respect to a designed wavelength of the laminated half-wave plate.

The variation with respect to the designed wavelength was simulated using as an estimated value of the conversion efficiency a conversion ratio RT which is obtained by dividing the minimum value Tmin of the conversion efficiency by the difference $\Delta T$ between the maximum value and the minimum value of the conversion efficiency. The result is shown in FIG. 4. It can be seen from the drawing that the conversion ratio RT is the highest in the vicinity of the designed wavelength $\lambda_0=510$ nm.

Figure 5:
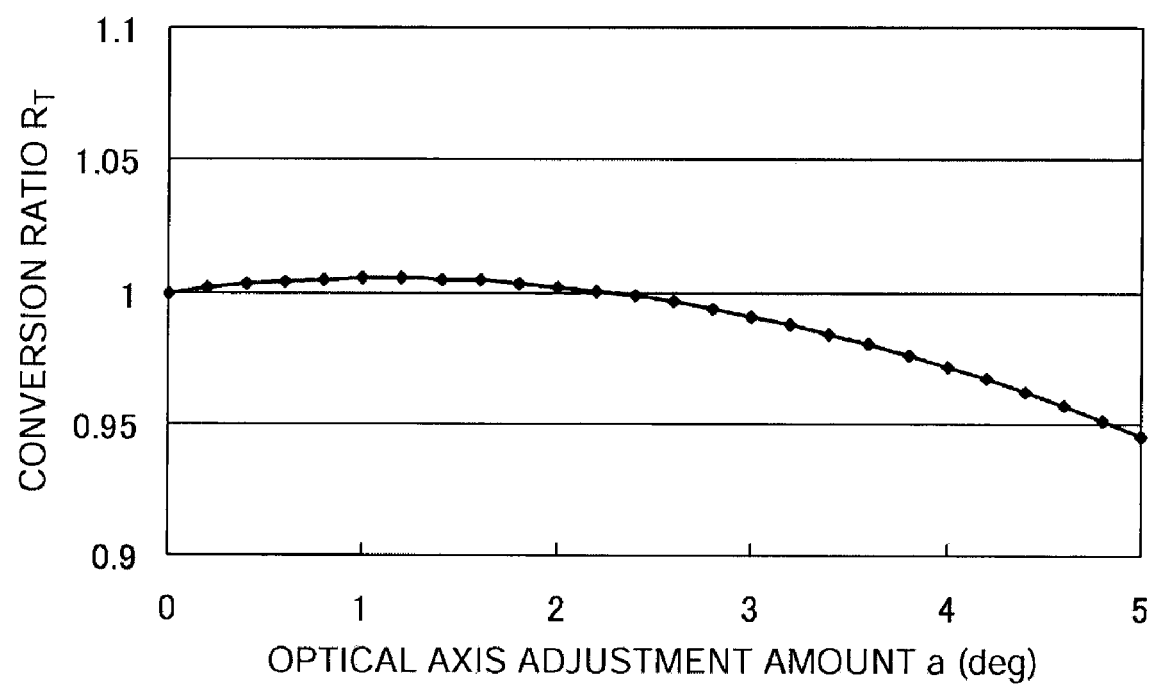
FIG. 5 is a diagram illustrating conversion ratio with respect to an optical axis adjustment amount of the laminated half-wave plate.
Figure 6:
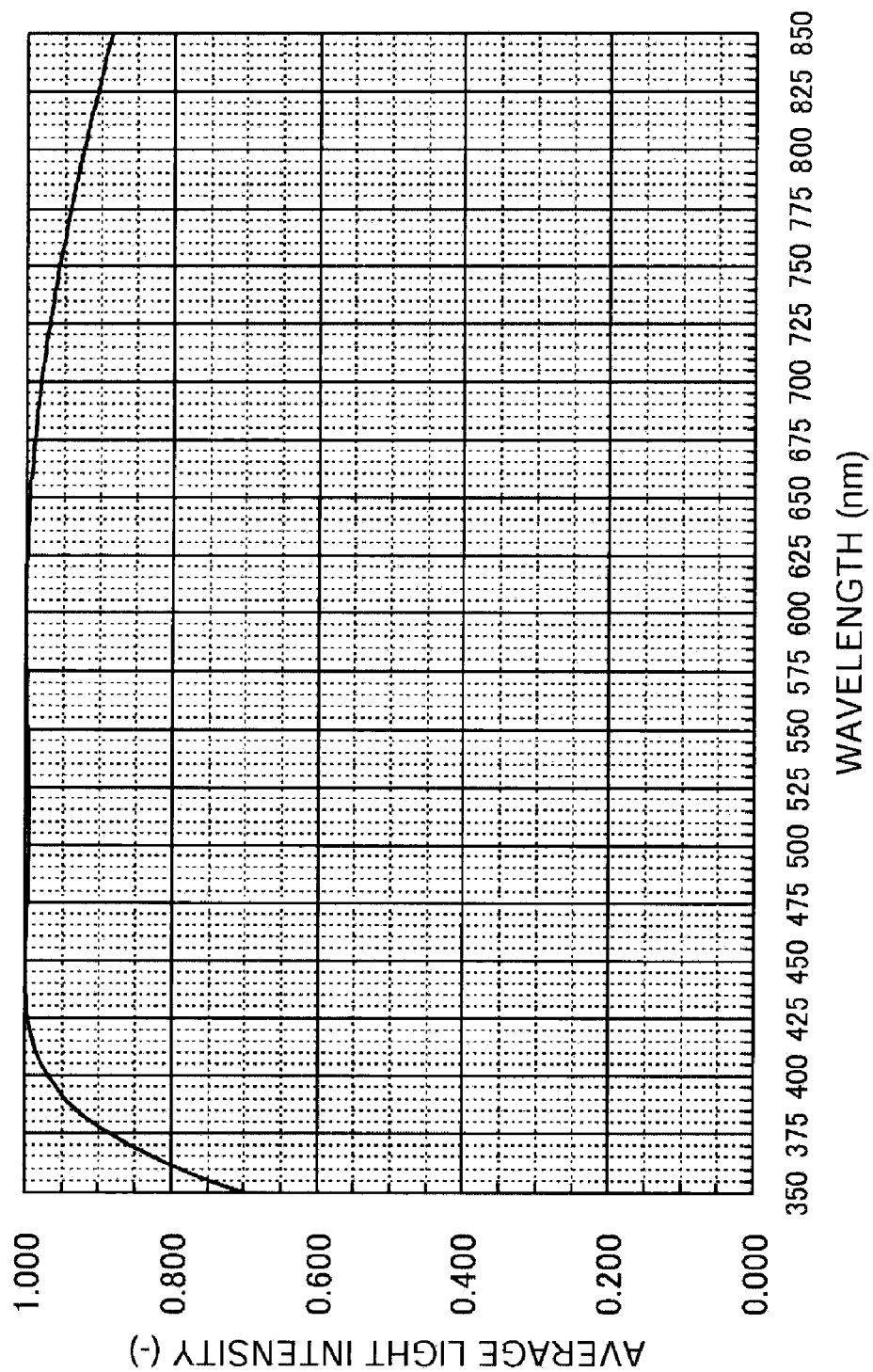
FIG. 6 is a diagram illustrating transmitted light intensity with respect to a wavelength of the laminated half-wave plate.

Accordingly, to determine the optimal range of the optical axis adjustment amount a, the variation of the conversion ratio RT with respect to the optical axis adjustment amount a in the laminated half-wave plate 11 with a designed wavelength $\lambda_0=510$ nm was simulated. The result is shown in FIG. 5. It can be seen from the drawing that the conversion ratio, that is, the conversion efficiency, is much higher in the range of 0<a<2.2° than that at a=0°. The variation in transmitted light intensity with respect to the wavelength of the laminated half-wave plate is shown in FIG. 6. It can be seen from the drawing that high transmitted light intensity, that is, high conversion efficiency, can be obtained all over the broad band of 400 to 700 nm.

Figure 7:
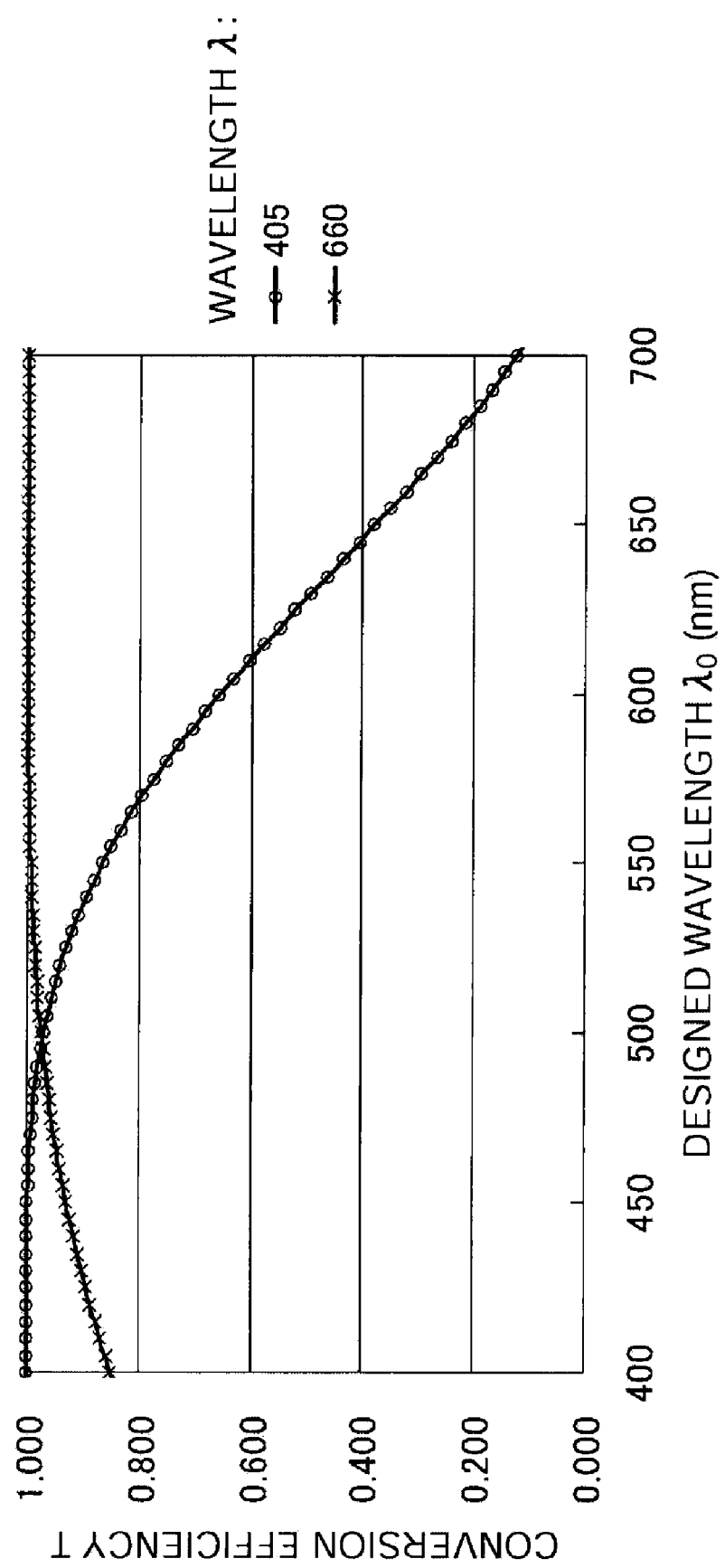
FIG. 7 is a diagram illustrating the conversion efficiency with respect to the designed wavelength of the laminated half-wave plate at used wavelengths of 405 and 660 nm.

According to the embodiment of the invention, it is possible to implement a laminated half-wave plate having a high conversion efficiency, which is usable in an optical pickup device, in both a wavelength band of 405 nm in accordance with the Blu-ray disc standard and a wavelength band of 660 nm in accordance with the DVD standard. FIG. 7 shows the variation of the conversion efficiency with respect to the designed wavelength in the available wavelength bands of $\lambda=405$ nm and $\lambda=660$ nm. It can be seen from the drawing that by setting the designed wavelength to $\lambda_0=500$ nm, a high conversion efficiency of 0.97 or higher can be obtained in both wavelength bands of 405 nm and 660 nm.

Figure 8:
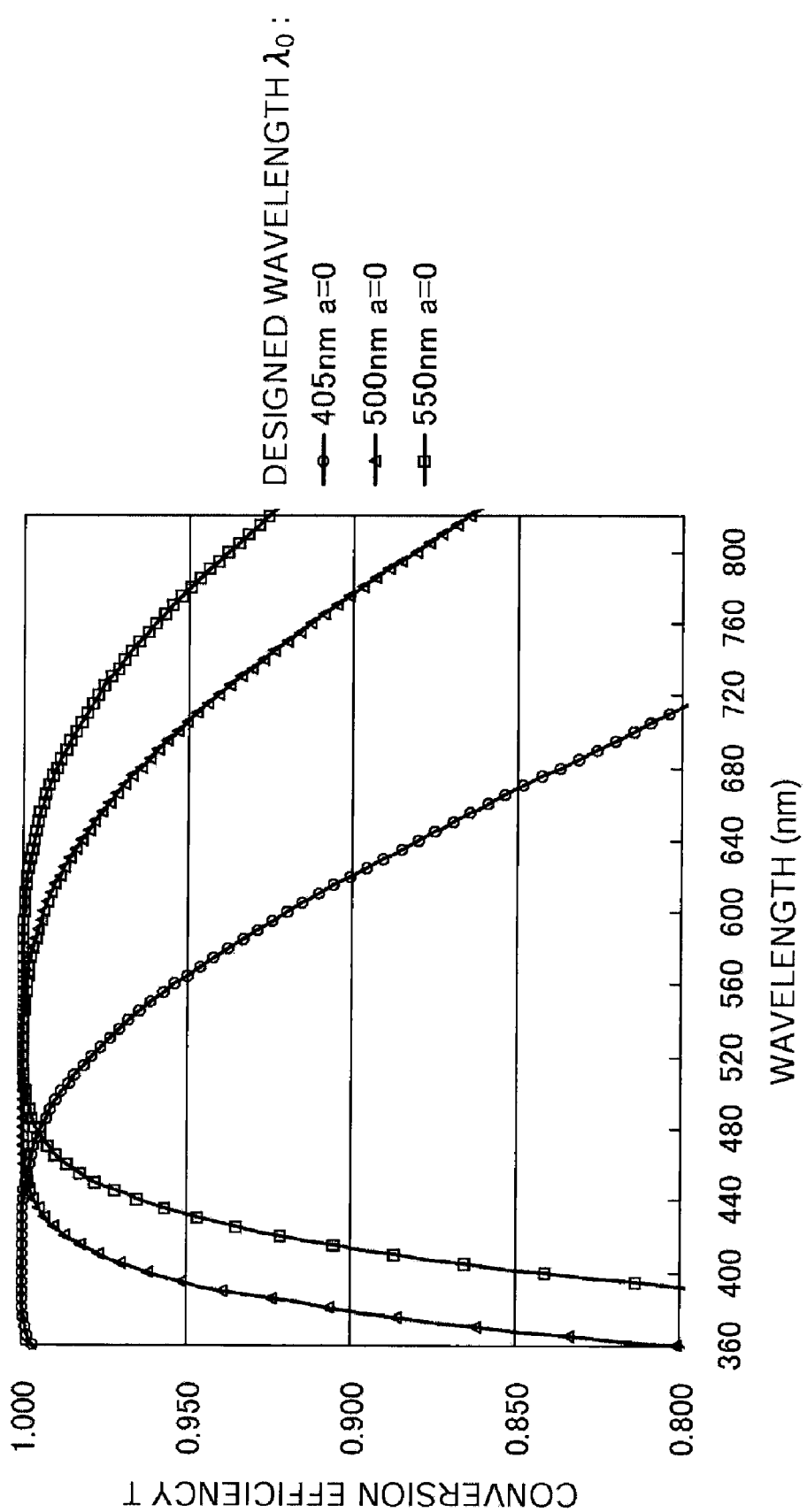
FIG. 8 is a diagram illustrating the conversion efficiency with respect to the wavelength of the laminated half-wave plate with a designed wavelength of $\lambda_0$=405, 500, and 550 nm.

When the designed wavelength is set to $\lambda_0=405$, 500, and 550 nm, the wavelength dependence, that is, the variation of the conversion efficiency with respect to the wavelength, of the laminated half-wave plate 11 was verified with the optical axis adjustment amount a=0. The result is shown in FIG. 8. It can be seen from the drawing that the conversion efficiency with the designed wavelength $\lambda_0=405$ nm excessively decreases in the wavelength band of 660 nm and the conversion efficiency with the designed wavelength $\lambda_0=550$ nm excessively decreases in the wavelength band of 405 nm, but the conversion efficiency with the designed wavelength $\lambda_0=500$ nm decreases less in the wavelength band of 660 nm.

Figure 9:
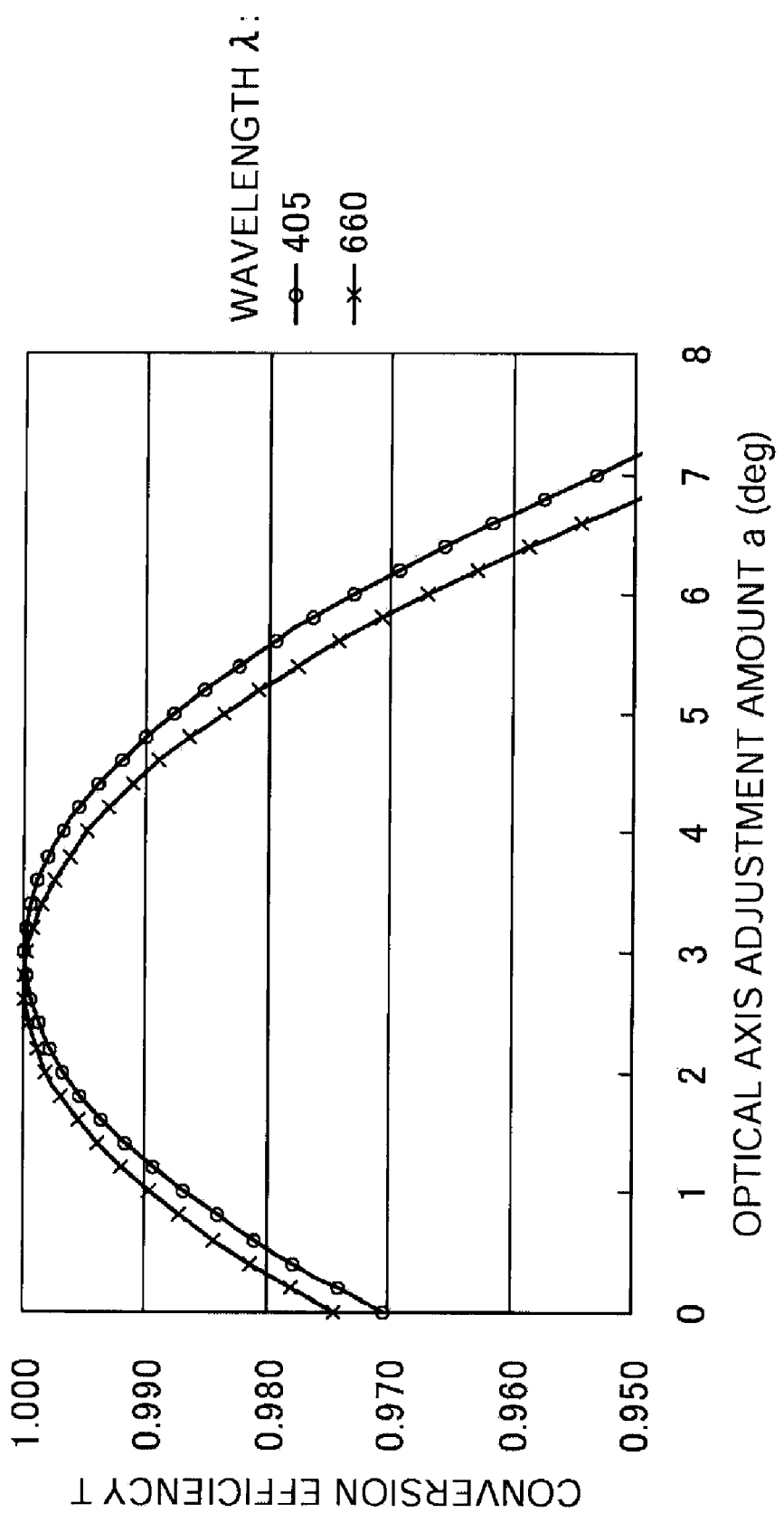
FIG. 9 is a diagram illustrating the conversion efficiency with respect to the optical axis adjustment amount of the laminated half-wave plate with the designed wavelength of $\lambda_0=500$ nm at the used wavelengths of 405 and 660 nm.

Therefore, the conversion efficiency with respect to the optical axis adjustment amount a in the usable wavelengths of 405 nm and 660 nm with the designed wavelength $\lambda_0=500$ nm was simulated. The result is shown in FIG. 9. It can be seen from the drawing that by setting the optical axis adjustment amount a to 2.8°$\leq$a$\leq$3°, the conversion efficiency of the laminated half-wave plate is almost 1 in both wavelength bands of 405 nm and 660 nm. Accordingly, the laminated half-wave plate can be used in the optical pickup device which can record and reproduce data from and to an optical disk in both standards of the Blu-ray disc and the DVD.

According to the embodiment of the invention, the laminated half-wave plate which can be used in the entire broad bandwidth of 400 to 700 nm and which is suitable for a projection display apparatus such as a liquid crystal projector is implemented. To determine the range of the optical axis adjustment amount a which is optimal for acquiring an excellent conversion efficiency in the broad bandwidth, first, when the use wavelength is in the wavelength bands of 405 ($\pm$30), 660($\pm$30), and 785($\pm$30) nm, the conversion ratio with respect to the optical axis adjustment amount a in the laminated half-wave plate was simulated at the designed wavelength of $\lambda_0$=400, 500, 600, 700, and 800 nm. The simulation result in the wavelength band of 405 nm is shown in FIG. 10A, the simulation result in the wavelength band of 660 nm is shown in FIG. 10B, and the simulation result in the wavelength band of 785 nm is shown in FIG. 10C.

Figure 10A:
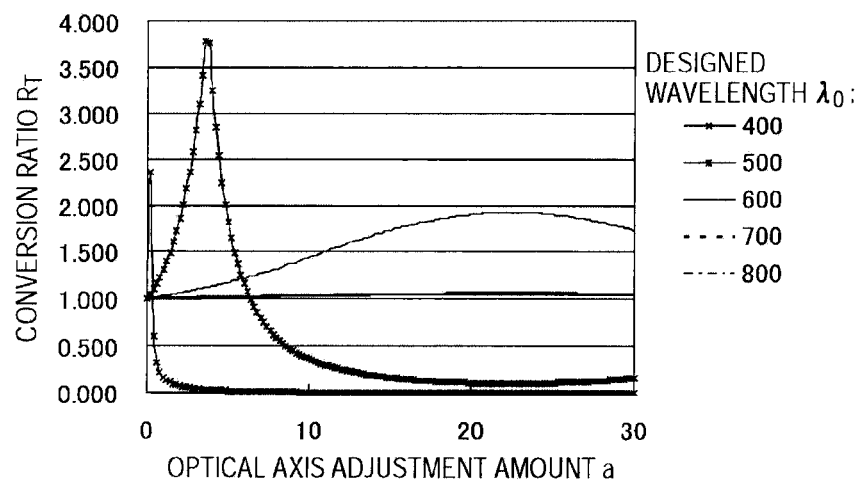
FIGS. 10A to 10C are diagrams illustrating the conversion efficiency with respect to the optical axis adjustment amounts of the laminated half-wave plates with different designed wavelengths at the used wavelengths of 405, 660, and 785 nm.

It can be seen from FIG. 10A that when the use wavelength is in the wavelength band of 405 nm and the designed wavelength is set to $\lambda_0$=700 and 800 nm, the conversion ratio does not vary even with the increase of the optical axis adjustment amount a and thus the conversion efficiency is not improved. It can be seen from FIG. 10B that in the wavelength band of 660 nm and at all the designed wavelengths, the conversion ratio increases with the increase of the optical axis adjustment amount a and thus an excellent conversion efficiency is obtained. It can be seen from FIG. 10C that in the wavelength band of 785 nm and at the designed wavelength of $\lambda_0$=800 nm, the conversion ratio decreases and thus the conversion efficiency is not improved. However, in consideration of FIGS. 10A to 10C together, it can be seen that in any wavelength band, the conversion ratio increases with the increase of the optical axis adjustment amount a, and a designed wavelength at which an excellent conversion efficiency can be obtained exists.

Figure 10B:
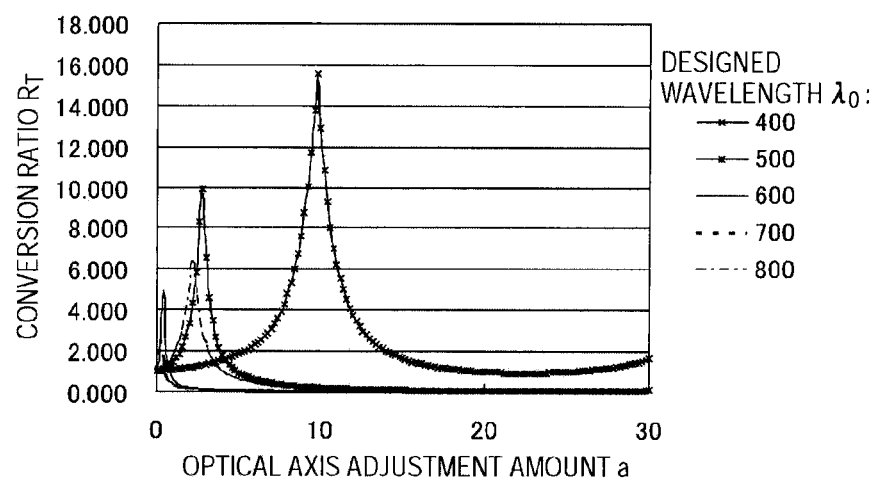
Figure 10C:
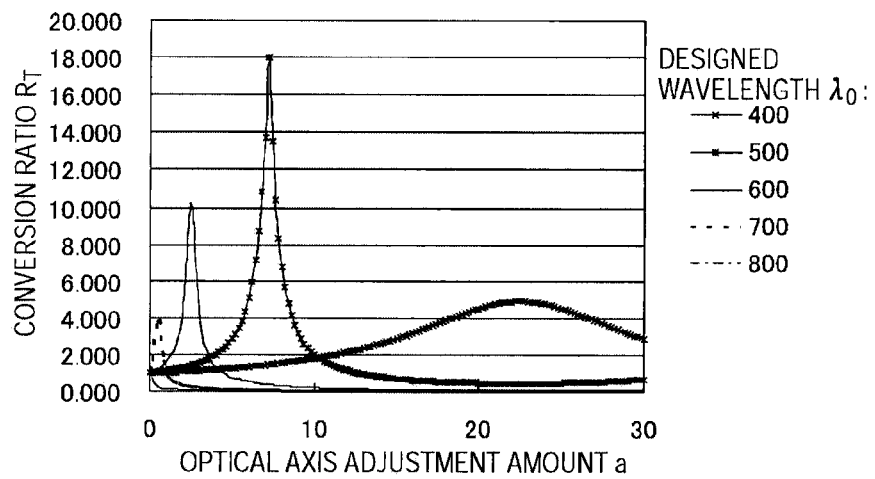
Figure 11A:
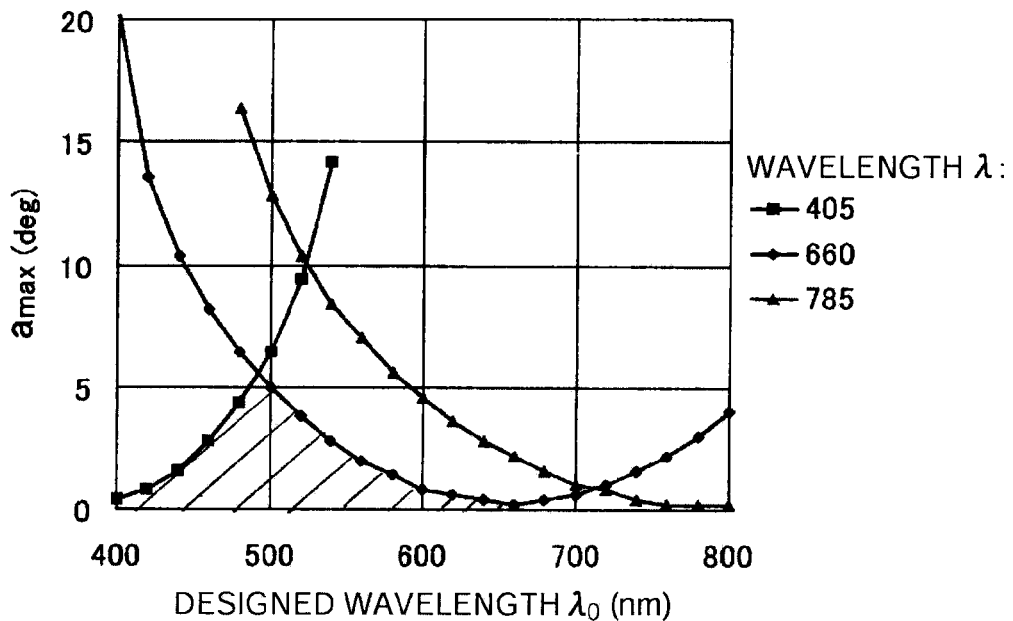
FIGS. 11A and 11B are diagrams illustrating the maximum value of the optical axis adjustment amount with respect to the designed wavelength of the laminated half-wave plate at the used wavelengths of 405, 660, and 785 nm, where
Figure 11B:
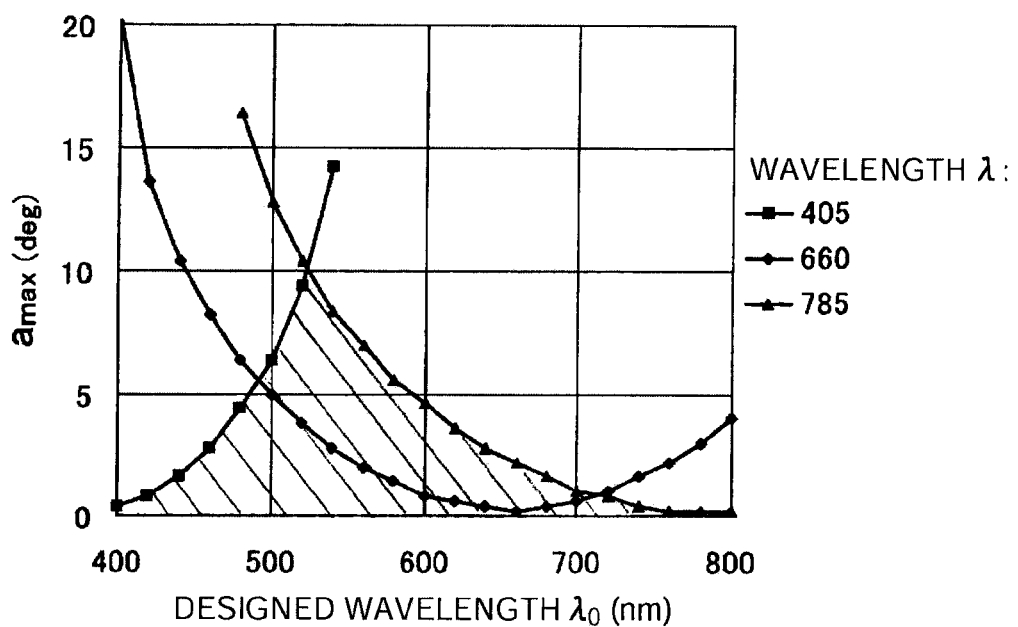

Therefore, the correlation between the designed wavelength $\lambda_0$ in the wavelength bands (405, 660, and 785 nm) and the maximum value $a_{max}$ of the optical axis adjustment amount is extracted from FIGS. 10A to 10C and is shown in FIGS. 11A and 11B. In FIGS. 11A and 11B, the characteristic curves indicating the correlation between $\lambda_0$ in each wavelength band and $a_{max}$ are the same. FIG. 11A shows that the hatched portion below the curves of the wavelength bands of 405 nm and 660 nm is the range of the optical axis adjustment amount a by which excellent conversion efficiencies can be obtained in both bands.

FIG. 11B shows that the hatched portion below the curves of the wavelength bands of 405 nm and 785 nm is the range of the optical axis adjustment amount a by which excellent conversion efficiencies can be obtained in both bands. It can be seen from the drawing that the maximum value $a_{max}$ of the optical axis adjustment amount is preferably set to $0 < a_{max} \leq 10.0$ at $\lambda_0$=520 nm.

In brief, the maximum value $a_{max}$ of the optical axis adjustment amount by which a more excellent conversion efficiency of the laminated half-wave plate shown in FIG. 1 can be obtained than that in the related art, that is, the case with the optical axis adjustment amount of a=0 can be set in three designed wavelength ranges of 400 nm$\leq\lambda_0\leq$490 nm, 490 nm$\leq\lambda_0\leq$520 nm, and 520 nm$\leq\lambda_0\leq$800 nm. The maximum value $a_{max}$ is determined using the curve of the wavelength band of 405 nm in the designed wavelength range of 400 nm$\leq\lambda_0\leq$490 nm, using the curve of the wavelength band of 660 nm in the designed wavelength range of 490 nm$\leq\lambda_0\leq$520 nm, and using the curve of the wavelength band of 785 nm in the designed wavelength range of 520 nm$\leq\lambda_0\leq$800 nm.

The curves corresponding to the correlations of the wavelength bands can be expressed by the following approximate expressions. That is, in the designed wavelength range of 400 nm$\leq\lambda_0\leq$490 nm, the maximum value $a_{max}$ of the optical axis adjustment amount is set to satisfy the following expressions:

$$a_{max} = A_0 + A_1 \cdot \phi + A_2 \cdot \phi^2 + A_3 \cdot \phi^3 + A_4 \cdot \phi^4 + A_5 \cdot \phi^5;$$

$A_0$=0.00001548;
$A_1$=0.0427887;
$A_2$=−0.000385;
$A_3$=1.723×10$^{-6}$;
$A_4$=−4.19×10$^{-9}$; and
$A_5$=4.086×10$^{-12}$.

In the designed wavelength range of 490 nm$\leq\lambda_0\leq$520 nm, the maximum value $a_{max}$ of the optical axis adjustment amount is set to satisfy the following expressions:

$$a_{max} = A_0 + A_1 \cdot \phi + A_2 \cdot \phi^2 + A_3 \cdot \phi^3 + A_4 \cdot \phi^4 + A_5 \cdot \phi^5 + A_6 \cdot \phi^6 + A_7 \cdot \phi^7;$$

$A_0$=0.00006705;
$A_1$=17.699248;
$A_2$=−0.16963;
$A_3$=0.0006754;
$A_4$=−1.4×10$^{-6}$;
$A_5$=1.68×10$^{-9}$;
$A_6$=−1.1×10$^{-12}$; and
$A_2$=2.72×10$^{-16}$.

In the designed wavelength range of 520 nm$\leq\lambda_0\leq$800 nm, the maximum value $a_{max}$ of the optical axis adjustment amount is set to satisfy the following expressions:

$$a_{max} = A_0 + A_1 \cdot \phi + A_2 \cdot \phi^2 + A_3 \cdot \phi^3 + A_4 \cdot \phi^4 + A_5 \cdot \phi^5 + A_6 \cdot \phi^6;$$

$A_0$=0.00003014;
$A_1$=5.4681617;
$A_2$=−0.038557;
$A_3$=0.0001094;
$A_4$=−1.56×10$^{-7}$;
$A_5$=1.106×10$^{-10}$; and
$A_6$=−3.13×10$^{-14}$.

By using the relational expressions, it is possible to determine the designed wavelength of the laminated half-wave plate according to the embodiment of the invention and to simply determine the maximum value $a_{max}$ of the optical axis adjustment amount on the basis of the determined designed wavelength. Accordingly, it is possible to suppress as much as possible the decease in conversion efficiency in the entire wavelength bands of 400 to 800 nm, thereby obtaining an excellent conversion efficiency.

Figure 12:
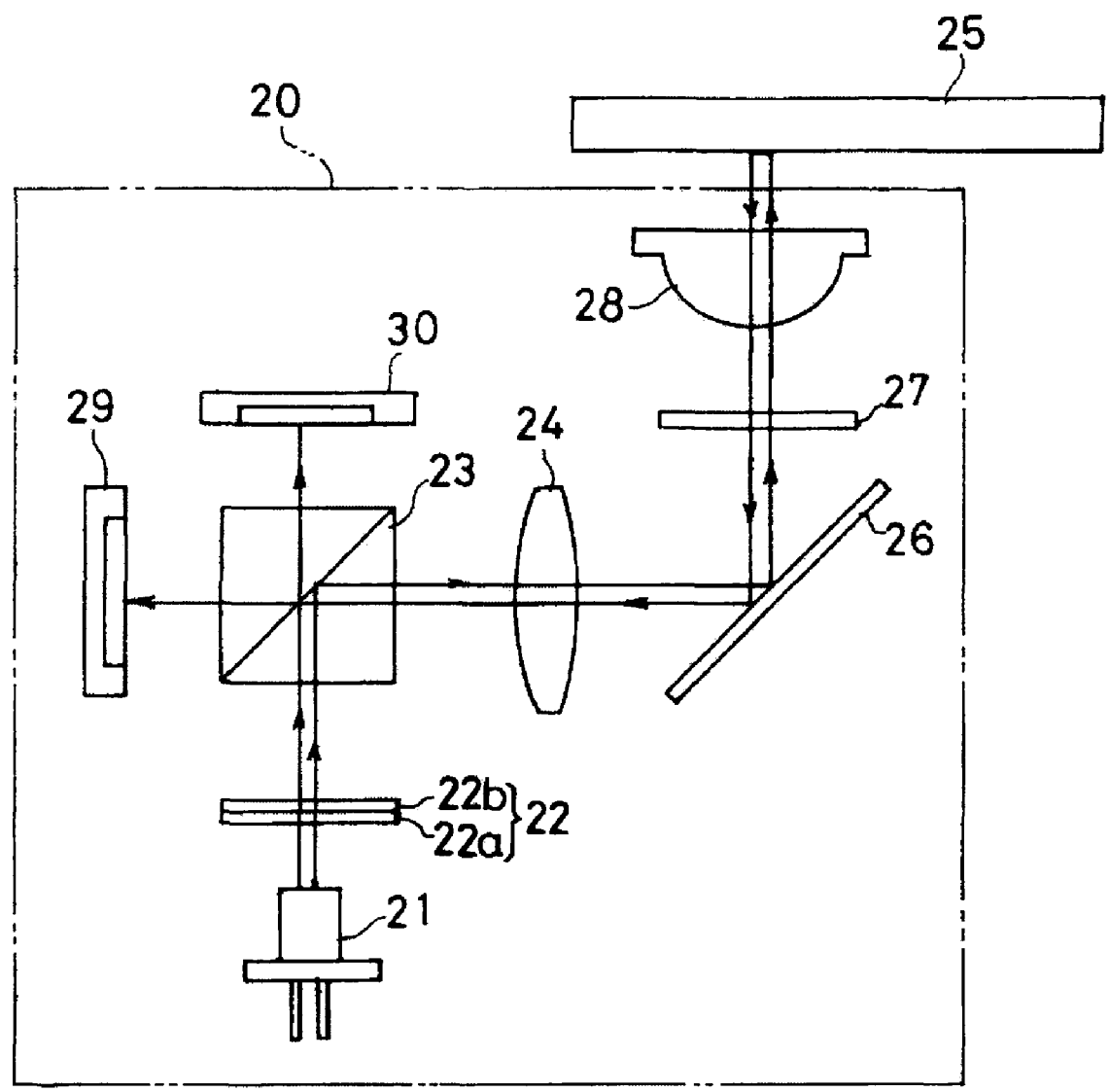
FIG. 12 is a diagram schematically illustrating a configuration of an optical pickup device employing the laminated half-wave plate according to an embodiment of the invention.

FIG. 12 shows an optical pickup device employing the laminated half-wave plate according to the embodiment of the invention. The optical pickup device 20 is used to record and reproduce data on and from an optical disk device such as a Blu-ray Disc, and includes a light source 21 formed of a laser diode emitting a laser beam such as a violet-blue beam with a wavelength of 405 nm. The optical pickup device 20 is provided with a diffraction grating 22 diffracting the laser beam from the light source 21, a polarization beam splitter 23 dividing the laser beam transmitted by the diffraction grating 22 into a P-polarized component and an S-polarized component and transmitting or reflecting the components, a collimator lens 24 collimating the laser beam reflected by the polarization beam splitter 23, a mirror 26 reflecting the laser beam passing through the collimator lens 24 toward an optical disk 25, a quarter-wave plate 27 converting the linearly-polarized laser beam reflected by the mirror 26 into a circularly-polarized beam, an objective lens 28 focusing the laser beam passing through the quarter-wave plate 27, and a light detector 29 detecting the laser beam reflected from the optical disk 25. The optical pickup device 20 further includes a monitoring light detector 30 detecting the laser beam output from the light source 21 and transmitted by the polarization beam splitter 23.

The operation of the optical pickup device 20 will be described now. The linearly-polarized laser beam output from the light source 21 is divided into three beams by the diffraction grating 22 for the tracking control based on a 3-beam method, and then the S-polarized component is reflected by the polarization beam splitter 23 and is collimated by the collimator lens 24. The collimated laser beam is totally reflected by the mirror 26, is converted into a circularly-polarized beam from the linearly-polarized beam by the quarter-wave plate 27, is focused by the objective lens 28, and is applied to a pit of a signal recording layer formed in the optical disk 25. The laser beam reflected by the pit is transmitted by the objective lens, is converted from the circularly-polarized beam into a linearly-polarized beam by the quarter-wave plate 27, is totally reflected by the mirror 26, is transmitted by the collimator lens 24 and the polarization beam splitter 23, and is incident on and detected by the light detector 29. Accordingly, the operation of reading the signals recorded on the optical disk is performed. The P-polarized component of the laser beam output from the light source 21 is transmitted by the polarization beam splitter 23 and is incident on and detected by the monitoring light detector 30. The output of the laser beam from the laser diode is controlled by the detection output.

The diffraction grating 22 includes a diffraction grating portion 22a dividing a laser beam as described above, and a half-wave plate 22b converting an incident laser beam into a linearly-polarized beam of S polarization. The half-wave plate according to the embodiment of the invention is used as the half-wave plate 22b. Accordingly, even when the wavelength of the laser beam varies due to the temperature drift of the oscillated laser beam at the time of using the optical pickup device 20, the conversion efficiency of the half-wave plate 22b does not decrease or the decrease is suppressed as much as possible, thereby constantly guaranteeing sufficient light intensity. As a result, to cope with a decrease in wavelength and an increase in power of the used laser beam, it is possible to realize the optical pickup device capable of exhibiting stable and satisfactory performance in a wavelength range with a broader bandwidth.

The laminated half-wave plate according to the embodiment of the invention can be suitably used in a projection display apparatus such as a liquid crystal projector provided with a liquid crystal panel, since the utilization efficiency of light is very high. Particularly, in the projection display apparatus employing a liquid crystal panel modulating a light flux (an S-polarized beam or a P-polarized beam) in a particular polarization direction, the optical system is generally set so that a linearly-polarized beam is unified to either the P-polarized beam or the S-polarized beam and is incident on the liquid crystal panel. Accordingly, the projection display apparatus is mounted with a polarization converter (PS converter) converting a randomly-polarized beam from the light source into a P-polarized beam or an S-polarized beam to raise the utilization efficiency of light.

Figure 13A:
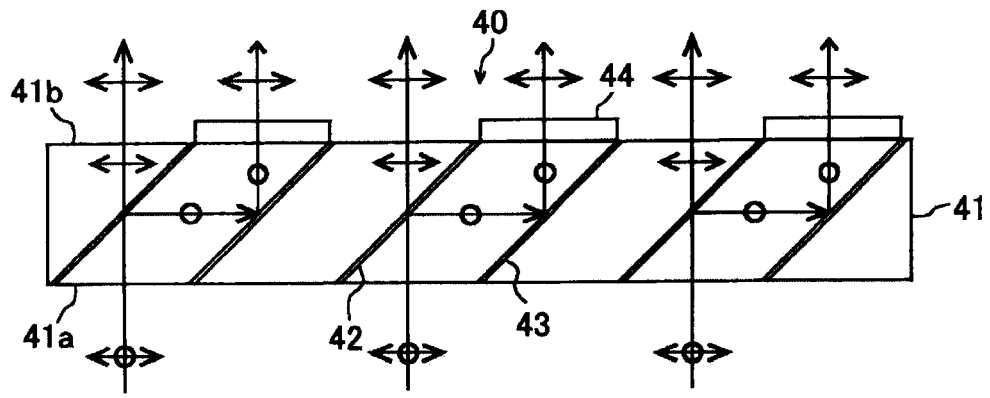
FIGS. 13A, 13B, and 13C are diagrams schematically illustrating different configurations of a polarization converter employing the laminated half-wave plate according to an embodiment of the invention.
Figure 13B:
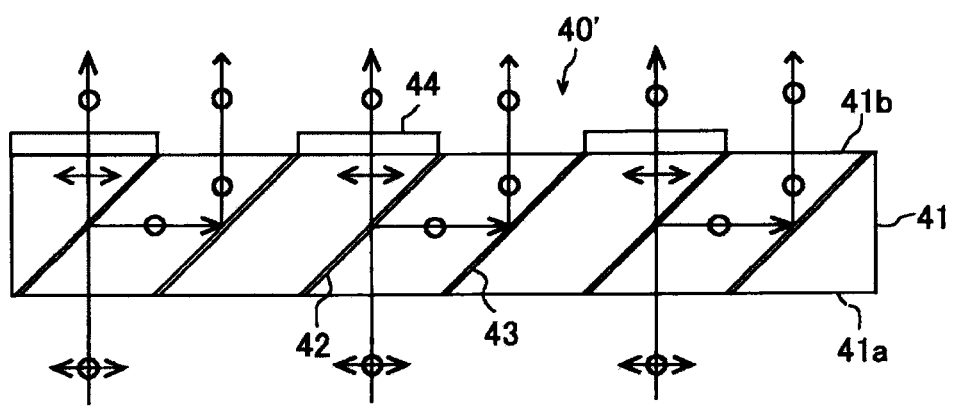
Figure 13C:
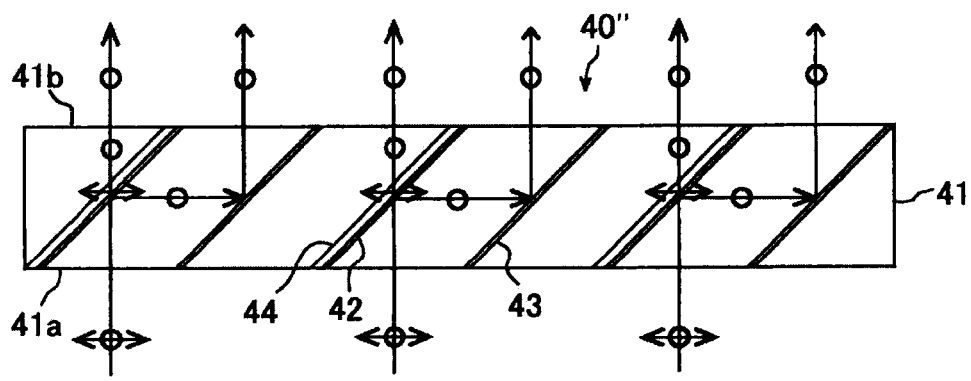

FIGS. 13A to 13C show three polarization converters 40, 40', and 40" with different configurations, which can be suitably used in the projection display apparatus such as a liquid crystal projector, and the laminated half-wave plate according to the embodiment of the invention can be used for any one of them. Accordingly, the polarization converters 40, 40', and 40" can suppress as much as possible the decrease in conversion efficiency in a wavelength range with a broader bandwidth, and thus it is possible to use light energy more efficiently.

The polarization converter 40 shown in FIG. 13A includes a prism array 41 formed of a planar light-transmitting substrate having a first main surface 41a as a light incident surface and a second main surface 41b as a light output surface. In the light-transmitting substrate, a polarization separating film 42 tilted about the first and second main surfaces and a reflective film 43 are alternately arranged in parallel with a predetermined gap therebetween.

The polarization separating film 42 separates the randomly-polarized beam, which is incident on the prism array 41 from the first main surface 41a, into the S-polarized component and the P-polarized component, then transmits the P-polarized component, and reflects the S-polarized component. The P-polarized component transmitted by the polarization separating film 42 is output from the prism array 41 through the second main surface 41b without any change.

The S-polarized component reflected by the polarization separating film is reflected by the reflective film 43 and is output from the prism array 41 through the second main surface 41b. In the second main surface 41b, the half-wave plate 44 is disposed in a portion from which the S-polarized component reflected by the reflective film is output. The half-wave plate 44 converts an incident linearly-polarized beam of S polarization into the P-polarized beam and outputs the P-polarized beam. In this manner, the polarization converter 40 is configured for the incident beam to be output in parallel as the P-polarized beam, and can thus be suitably mounted on the projection display apparatus of a P-polarization optical system.

FIG. 13B shows the configuration of the polarization converter 40' which can be suitably mounted on the projection display apparatus of an S polarization optical system. In the polarization converter 40', the half-wave plate 44 is disposed in a portion of the second main surface 41b from which the P-polarized component transmitted by the polarization separating film 42 is output. Accordingly, the linearly-polarized beam of P polarization transmitted by the polarization separating film 42 is converted into an S-polarized beam and is then output. On the other hand, the S-polarized component reflected by the polarization separating film is reflected by the reflective film 43, and is then output from the prism array 41 as an S-polarized beam. Accordingly, the beam incident on the polarization converter 40' is output in parallel as the S-polarized beam.

FIG. 13C shows the polarization converter 40" in which a half-wave plate 44 is disposed in the light-transmitting substrate of the prism array 41. The half-wave plates 44 are laminated on the beam output surface of the polarization separating film 42, and are alternately arranged in parallel with a predetermined gap from the reflective film 43.

The polarization separating film 42 separates the randomly-polarized beam incident from the first main surface 41a into an S-polarized component and a P-polarized component, then transmits the P-polarized component, and reflects the S-polarized component. The S-polarized component reflected by the polarization separating film 42 is reflected by the reflective film 43, and is output from the prism array 41 through the second main surface 41b. The P-polarized component transmitted by the polarization separating film is directly incident on the half-wave plate 44, is converted into the S-polarized beam thereby, and then is output from the prism array 41 through the second main surface. In this manner, the beam incident on the polarization converter 40" is output in parallel as the S-polarized beam.

When the laminated half-wave plate according to the embodiment of the invention is used as the half-wave plate 44 of the polarization converter 40", the thicknesses of the first and the second wave plates thereof can be set such that the phase differences $\Gamma_1$ and $\Gamma_2$ thereof in the traveling direction of the transmitted beam, i.e., in the direction of 45° about the first and second main surfaces 41a and 41b, satisfy the following expressions:

$\Gamma_1 = 180°$; and $\Gamma_2 = 180°$.

The optical axis bearing angles of the first and the second wave plates can be set so that the projection angles $\theta_1$ and $\theta_2$ of the optical axes onto the first main surface 41a satisfy the following expressions:

$\theta_1 = \phi/4 + a$;

$\theta_2 = 3\phi/4 - a$;

$22.5° < \theta_1 < 45.0°$; and $45.0° < \theta_2 < 67.5°$.

Here, the in-plane bearing angles of the optical axes in the first and the second wave plates are smaller than the projection angles onto the first and the second main surfaces.

Figure 14:
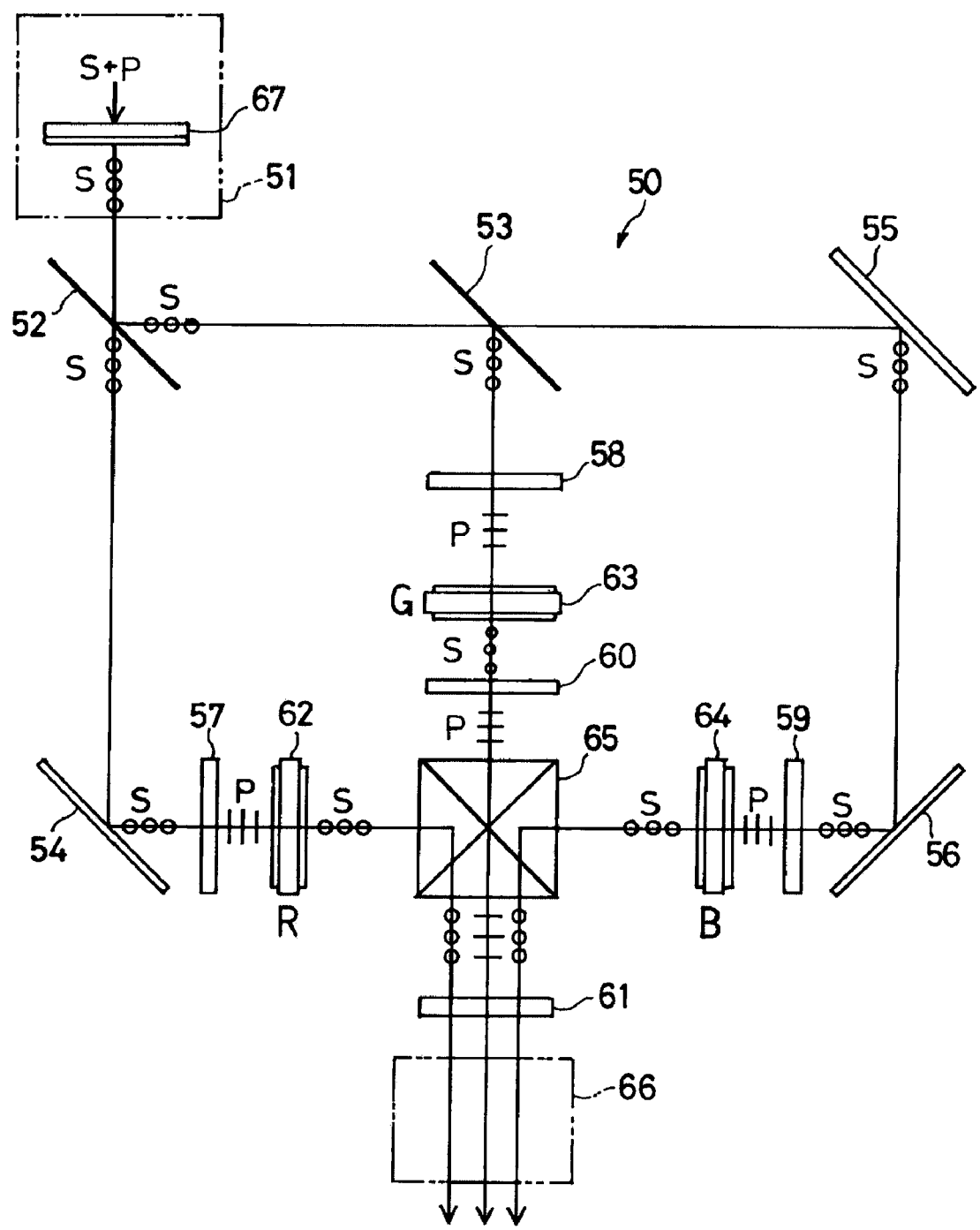
FIG. 14 is a diagram schematically illustrating a configuration of a projection display apparatus employing the laminated half-wave plate according to the embodiment of the invention.

FIG. 14 schematically shows an example of a projection display apparatus employing the laminated half-wave plate according to the embodiment of the invention. The projection display apparatus 50 includes a lighting optical system 51, dichroic mirrors 52 and 53, reflecting mirrors 54 to 56, λ/2-wave plates 57 to 61, liquid crystal light valves 62 to 64, a cross dichroic prism 65, and a projection lens system 66. The lighting optical system 51 includes a light source for lighting the liquid crystal light valves 62 to 64, a polarization converter 67, and a light condensing lens. The polarization converter 67 can employ the polarization converter shown in FIG. 13B, and serves to convert and output a randomly-polarized beam from the light source into an S-polarized beam.

From a white S-polarized beam output from the lighting optical system 51, a red beam is transmitted by the dichroic mirror 52 and a blue beam and a green beam are reflected by the dichroic mirror. The red beam transmitted by the dichroic mirror 52 is reflected by the reflecting mirror 54, is transmitted by the λ/2-wave plate 57 by which the red beam is converted into a P-polarized beam, and is then incident on the liquid crystal light valve 62 for red. The green beam reflected by the dichroic mirror 52 is reflected by the dichroic mirror 53 again, is transmitted by the λ/2-wave plate 58 by which the green beam is converted into a P-polarized beam, and is then incident on the liquid crystal light valve 63 for green. The blue beam reflected by the dichroic mirror 52 is transmitted by the dichroic mirror 53, is reflected by the reflecting mirrors 55 and 56, is transmitted by the λ/2 wave plate 59 by which the blue beam is converted into a P-polarized beam, and is then incident on the liquid crystal light valve 64 for blue.

The liquid crystal light valves 62 to 64 are light modulators modulating the color beams on the basis of given image information (image signal) so as to form an image. The cross dichroic prism 65 is a color synthesizer synthesizing a red S-polarized beam and a blue S-polarized beam output from the liquid crystal light valves 62 and 64 and a green P-polarized beam converted into the P-polarized beam after being output from the liquid crystal light valve 63 to form a color image. The synthesized beam is output to the projection lens system 66 through the λ/2-wave plate 61. The projection lens system 66 is a projection optical system projecting the synthesized beam onto a projection screen to display a color image.

When the optical axes of the λ/2-wave plate 61 are determined so as to change the polarization directions of the S-polarized beam (red beam and blue beam) and the P-polarized beam (green beam) by 45°, the S-polarized component and the P-polarized component of the three colors occupy each half, thereby clearly projecting a color image onto the polarization screen. In addition, a λ/4-wave plate may be used instead of the λ/2 wave plate 61. In this case, by converting three color beams of red, green, and blue into elliptically-polarized beams and preferably circularly-polarized beams, the color image can be clearly projected even when a polarization screen is employed as the projection screen.

The laminated half-wave plate according to the embodiment of the invention may be employed as the λ/2 wave plates 57 to 61. Accordingly, the projection display apparatus 50 can suppress as much as possible the decrease in conversion efficiency in a wavelength range with a broader bandwidth in each of the λ/2 wave plates, thereby further enhancing the utilization efficiency of light. As a result, a bright color image can be obtained with a light source having the same power or a color image with the same brightness can be obtained even with a light source having lower power, thereby reducing power consumption.

The invention is not limited to the above-mentioned embodiments, but various modifications or changes can be made without departing from the technical scope of the invention. For example, the first and second wave plates can be formed of an optical uniaxial crystalline material other than a quartz crystal. The invention may be similarly applied to an optical pickup device, a polarization converter, and a projection display apparatus with a configuration different from the above-mentioned embodiments, or to another optical apparatus.

The entire disclosure of Japanese Patent Application No. 2009-081231, filed Mar. 30, 2009 is expressly incorporated by reference herein.

What is claimed is:

1. A laminated wave plate comprising a first wave plate with a phase difference of $\Gamma_1 = 180°$ with respect to a designed wavelength $\lambda_0$ and a second wave plate with a phase difference of $\Gamma_2 = 180°$, in which the first wave plate and the second wave plate are arranged and laminated so that optical axes thereof intersect each other, wherein when in-plane bearing angles of optical axes of the first and second wave plates are represented by $\theta_1$ and $\theta_2$, an angle formed by a polarization direction of the linearly-polarized beam incident on the laminated wave plate and a polarization direction of a linearly-polarized beam output from the laminated wave plate is represented by $\phi$, and an optical axis adjustment amount is represented by a, the following expressions are satisfied:

$\theta_2 = \theta_1 + \phi/2$;

$\theta_1 = \phi/4 + a$;

$\theta_2 = 3\phi/4 - a$; and $0 < a \leq a_{max}$, wherein the maximum value $a_{max}$ of the optical axis adjustment amount satisfies the following expressions in the designed wavelength range of $400 \leq \lambda_0 \leq 490$ nm:

$a_{max} = A_0 + A_1 \cdot \phi + A_2 \cdot \phi^2 + A_3 \cdot \phi^3 + A_4 \cdot \phi^4 + A_5 \cdot \phi^5$;

$A_0=0.00001548$;
$A_1=0.0427887$;
$A_2=-0.000385$;
$A_3=1.723\times10^{-6}$;
$A_4=-4.19\times10^{-9}$; and
$A_5=4.086\times10^{-12}$,
satisfies the following expressions in the designed wavelength range of $490\leq\lambda_0\leq520$ nm:

$$a_{max}=A_0+A_1\cdot\varphi+A_2\cdot\varphi^2+A_3\cdot\varphi^3+A_4\cdot\varphi^4+A_5\cdot\varphi^5+A_6\cdot\varphi^6+A_7\cdot\varphi^7;$$

$A_0=0.00006705$;
$A_1=17.699248$;
$A_2=-0.16963$;
$A_3=0.0006754$;
$A_4=-1.4\times10^{-6}$;
$A_5=1.68\times10^{-9}$;
$A_6=-1.1\times10^{-12}$; and
$A_7=2.72\times10^{-16}$, and
satisfies the following expressions in the designed wavelength range of $520\leq\lambda_0\leq800$ nm:

$$a_{max}=A_0+A_1\cdot\varphi+A_2\cdot\varphi^2+A_3\cdot\varphi^3+A_4\cdot\varphi^4+A_5\cdot\varphi^5+A_6\cdot\varphi^6;$$

$A_0=0.00003014$;
$A_1=5.4681617$;
$A_2=-0.038557$;
$A_3=0.0001094$;
$A_4=-1.56\times10^{-7}$;
$A_5=1.106\times10^{-10}$; and
$A_6=-3.13\times10^{-14}$.

2. The laminated wave plate according to claim 1, wherein the designed wavelength is set to $\lambda_0=500$ nm and the optical axis adjustment amount is set to the range of $2.8°\leq a\leq3°$.

3. The laminated wave plate according to claim 1, wherein the designed wavelength is set to $\lambda_0=510$ nm and the optical axis adjustment amount is set to the range of $0°<a\leq2.2°$.

4. A laminated wave plate comprising a first wave plate with a phase difference of $\Gamma_1=180°$ with respect to a designed wavelength $\lambda_0$ and a second wave plate with a phase difference of $\Gamma_2=180°$, in which the first wave plate and the second wave plate are arranged and laminated so that optical axes thereof intersect each other, the laminated wave plate converting an incident linearly-polarized beam into a linearly-polarized beam obtained by rotating a polarization plane of the incident linearly-polarized beam by a predetermined angle of 90° and outputting the converted linearly-polarized beam,
wherein when in-plane bearing angles formed by the polarization plane of the incident linearly-polarized beam and optical axes of the first and second wave plates are represented by $\theta_1$ and $\theta_2$, the following expressions are satisfied:
$22.5°<\theta_1<45.0°$; and
$45.0°<\theta_2<67.5°$.

5. The laminated wave plate according to claim 1, wherein the first and second wave plates are formed of quartz crystal.

6. An optical pickup device comprising:
a light source;
an objective lens focusing a beam emitted from the light source on a recording medium;
a detector detecting the beam reflected from the recording medium; and
the laminated wave plate according to claim 1 which is disposed in an optical path between the light source and the objective lens.

7. An optical pickup device comprising:
a light source;
an objective lens focusing a beam emitted from the light source on a recording medium;
a detector detecting the beam reflected from the recording medium; and
the laminated wave plate according to claim 4 which is disposed in an optical path between the light source and the objective lens.

8. A polarization converter comprising:
a flat light-transmitting substrate having a first main surface as a beam incidence surface and a second main surface as a beam output surface;
first and second thin optical films disposed in the substrate; and
a wave plate disposed on the second main surface of the light-transmitting substrate,
wherein the first and second thin optical films are alternately arranged in parallel with a gap therebetween to be tilted about the first and second main surfaces,
wherein the first thin optical film separates a beam input from the first main surface into a first linearly-polarized beam and a second linearly-polarized beam perpendicular to each other, transmits and outputs the first linearly-polarized beam from the second main surface, and reflects the second linearly-polarized beam,
wherein the second thin optical film reflects the second linearly-polarized beam reflected by the first thin optical film and outputs the reflected second linearly-polarized beam from the second main surface, and
wherein the wave plate is the laminated wave plate according to claim 1 which is disposed in a part of the second main surface outputting the first linearly-polarized beam transmitted by the first thin optical film or in a part of the second main surface outputting the second linearly-polarized beam reflected by the second thin optical film.

9. A polarization converter comprising:
a flat light-transmitting substrate having a first main surface as a beam incidence surface and a second main surface as a beam output surface;
first and second thin optical films disposed in the substrate; and
a wave plate disposed on the second main surface of the light-transmitting substrate,
wherein the first and second thin optical films are alternately arranged in parallel with a gap therebetween to be tilted about the first and second main surfaces,
wherein the first thin optical film separates a beam input from the first main surface into a first linearly-polarized beam and a second linearly-polarized beam perpendicular to each other, transmits and outputs the first linearly-polarized beam from the second main surface, and reflects the second linearly-polarized beam,
wherein the second thin optical film reflects the second linearly-polarized beam reflected by the first thin optical film and outputs the reflected second linearly-polarized beam from the second main surface, and
wherein the wave plate is the laminated wave plate according to claim 4 which is disposed in a part of the second main surface outputting the first linearly-polarized beam transmitted by the first thin optical film or in a part of the second main surface outputting the second linearly-polarized beam reflected by the second thin optical film.

10. A polarization converter comprising:
a flat light-transmitting substrate having a first main surface as a beam incidence surface and a second main surface as a beam output surface;

first and second thin optical films disposed in the light-transmitting substrate; and a wave plate, wherein the first and second thin optical films are alternately arranged in parallel with a gap therebetween to be tilted about the first and second main surfaces, wherein the first thin optical film separates a beam input from the first main surface into a first linearly-polarized beam and a second linearly-polarized beam perpendicular to each other, transmits the first linearly-polarized beam, and reflects the second linearly-polarized beam, wherein the second thin optical film reflects the second linearly-polarized beam reflected by the first thin optical film and emits the reflected second linearly-polarized beam from the second main surface, and wherein the wave plate is the laminated wave plate according to claim 1 which is disposed and laminated on the beam output surface of the first thin optical film outputting the first linearly-polarized beam.

11. A polarization converter comprising:

a flat light-transmitting substrate having a first main surface as a beam incidence surface and a second main surface as a beam output surface;

first and second thin optical films disposed in the light-transmitting substrate; and a wave plate, wherein the first and second thin optical films are alternately arranged in parallel with a gap therebetween to be tilted about the first and second main surfaces, wherein the first thin optical film separates a beam input from the first main surface into a first linearly-polarized beam and a second linearly-polarized beam perpendicular to each other, transmits the first linearly-polarized beam, and reflects the second linearly-polarized beam, wherein the second thin optical film reflects the second linearly-polarized beam reflected by the first thin optical film and emits the reflected second linearly-polarized beam from the second main surface, and wherein the wave plate is the laminated wave plate according to claim 4 which is disposed and laminated on the beam output surface of the first thin optical film outputting the first linearly-polarized beam.

* * * * *